US011921480B2

(12) United States Patent
Krishnamurthy et al.

(10) Patent No.: US 11,921,480 B2
(45) Date of Patent: Mar. 5, 2024

(54) OPTIMIZING DISTRIBUTED ENERGY RESOURCE VALUE

(71) Applicant: Hygge Energy Inc., Cupertino, CA (US)

(72) Inventors: Rajagopalan Krishnamurthy, Cupertino, CA (US); Leticia Santana, Toronto (CA)

(73) Assignee: Hygge Energy Inc., Cupertino, CA (US)

( * ) Notice: Subject to any disclaimer, the term of this patent is extended or adjusted under 35 U.S.C. 154(b) by 0 days.

(21) Appl. No.: 17/218,631

(22) Filed: Mar. 31, 2021

(65) Prior Publication Data
US 2022/0317640 A1 Oct. 6, 2022

(51) Int. Cl.
*G05B 19/042* (2006.01)

(52) U.S. Cl.
CPC .... *G05B 19/042* (2013.01); *G05B 2219/2639* (2013.01)

(58) Field of Classification Search
None
See application file for complete search history.

(56) References Cited

U.S. PATENT DOCUMENTS 6,633,823 B2 * 10/2003 Bartone ............ H02J 13/00028
702/57
7,305,281 B2 * 12/2007 Scott ...................... G06Q 40/04
700/286
7,660,649 B1 * 2/2010 Hope ..................... G06Q 10/04
700/28
8,019,483 B2 * 9/2011 Keefe ...................... B60L 53/63
700/286

(Continued)

FOREIGN PATENT DOCUMENTS

CN 111340456 A * 6/2020 .......... G06Q 10/103
CN 111342485 A * 6/2020

(Continued)

OTHER PUBLICATIONS

Sechilariu et al., "Supervision control for optimal energy cost management in DC microgrid: Design and simulation", International Journal of Electrical Power & Energy systems, vol. 58, pp. 140-149 (Year: 2014).*

(Continued)

*Primary Examiner* — Jason Lin
(74) *Attorney, Agent, or Firm* — Stratford Group Ltd.

(57) ABSTRACT

A system and method for allocating exported energy in a utility network is provided. A system and method comprising measuring the exported energy and a consumed energy via one or more IoT edge devices connected to a cloud computing infrastructure and coupled to one or more distributed energy resources in a community of energy consumers via a telecommunication network. Storing the measured exported energy and consumed energy on a memory coupled to a processor in the cloud computing infrastructure. Selecting one or more allocation algorithms executed by the processor based on the measured exported energy. Distributing and assigning the exported energy according to the one or more allocation algorithms selected and differentiating the community of energy consumers based on the one or more allocation algorithms selected.

20 Claims, 26 Drawing Sheets

(56) References Cited

U.S. PATENT DOCUMENTS

| | | | | |
|---|---|---|---|---|
| 8,978,225 | B2* | 3/2015 | James | E01F 9/635 |
| | | | | 404/10 |
| 9,679,276 | B1* | 6/2017 | Cuende | G06Q 20/3827 |
| 10,048,666 | B2* | 8/2018 | Martin Lloret | H02J 3/381 |
| 10,983,958 | B1* | 4/2021 | Miller | H02J 3/381 |
| 2004/0236857 | A1* | 11/2004 | Roy | H04L 9/40 |
| | | | | 709/224 |
| 2009/0088991 | A1 | 4/2009 | Brzezowski et al. | |
| 2009/0187284 | A1* | 7/2009 | Kreiss | G06Q 50/06 |
| | | | | 700/297 |
| 2012/0150679 | A1* | 6/2012 | Lazaris | H02J 3/386 |
| | | | | 705/26.2 |
| 2013/0166479 | A1* | 6/2013 | Hwang | G06Q 10/00 |
| | | | | 705/412 |
| 2013/0218356 | A1* | 8/2013 | Lee | H02J 13/0006 |
| | | | | 700/291 |
| 2014/0277797 | A1* | 9/2014 | Mokhtari | G06Q 30/0202 |
| | | | | 700/291 |
| 2015/0301546 | A1* | 10/2015 | Hornor | H02J 13/00 |
| | | | | 700/295 |
| 2016/0378894 | A1 | 12/2016 | Yoon | |
| 2017/0005515 | A1* | 1/2017 | Sanders | G05B 15/02 |
| 2017/0091878 | A1 | 3/2017 | Subburaj | |
| 2017/0176965 | A1* | 6/2017 | Martin Lloret | G06Q 50/06 |
| 2017/0286882 | A1 | 10/2017 | Fife | |
| 2017/0324276 | A1* | 11/2017 | Yoo | H02J 3/0075 |
| 2017/0359041 | A1* | 12/2017 | Morley | H03F 3/4508 |
| 2018/0034312 | A1* | 2/2018 | Abdulla | H02S 40/42 |
| 2019/0050949 | A1* | 2/2019 | Orsini | H02J 3/004 |
| 2019/0187193 | A1* | 6/2019 | Lee | G06Q 50/06 |
| 2020/0067312 | A1* | 2/2020 | Pavlovski | H02J 3/003 |
| 2021/0004265 | A1* | 1/2021 | Guim Bernat | H02J 3/381 |

FOREIGN PATENT DOCUMENTS

| | | | | |
|---|---|---|---|---|
| CN | 111966651 A | * | 11/2020 | G06F 16/178 |
| JP | 6172345 B1 | * | 8/2017 | |

OTHER PUBLICATIONS

Examiner's Requisition for corresponding CA Patent Application No. 3,150,092 dated May 9, 2023.

* cited by examiner

OPTIMIZING DISTRIBUTED ENERGY RESOURCE VALUE

FIELD OF THE INVENTION

The present disclosure relates to a method and system for determining the optimal deployment of distributed energy resources more specifically, but not by way of limitation, to a fast and accessible system and method for optimizing the value of distributed energy resources through hardware and method solutions, algorithms for allocating exported renewable energy, simplified block chain flow for embedded devices and a tokenized renewable energy marketplace.

BACKGROUND

Currently, deployment of distributed energy resources including renewable energy is commonly done without considering the full effects on the distribution grid. Energy planning is done in open-loop processes where targets are set at a macro level without considering local factors such as solar potential, grid limitations and local economics. In cases where there is some effort to anticipate the effects at a more granular level, analysis is a big undertaking with high cost and high overhead. These efforts rely on searching for studies carried on other locations with similar characteristics in the hope of finding relevant insights. This takes substantial time and effort. Moreover, there may be few applicable studies, especially those that are truly representative if at all. Another common option is to hire an electrical consulting agency to perform the analysis which may include some level of electrical simulation of the network. This option is expensive, and reports take months to produce. This can sometimes mean that they are obsolete by the time of completion.

Moreover, traditional energy production accounting is done on a one-to-one basis between the utility and the exporter using methods such as net-metering. Each utility customer who has a generation resource such as solar panels, produces a certain amount of power every instant totaling to a certain energy over each day depending on various factors such as the amount of sunlight. A portion of this power goes to serve the customer's local energy needs and the remaining is exported on to the utility grid. The sum of this exported power is the net energy exported by the customer and is deemed to have been delivered to the utility. The customer is credited for this energy using some predetermined method. In reality, the energy exported flows laterally to nearby consumers to serve their consumption as each instant.

It can be seen that in the traditional method, there is no accounting for lateral energy/power flows. With the proliferation of DERs, we can expect that in future economies there will be more lateral flow of power and energy. It is also anticipated that individuals and communities will want to take account of such lateral flows and benefit from it, giving rise to methods such as community net-metering or/and energy trading between neighbors (peer-to-peer transactional energy).

The prevalent state of the art for inclusion of embedded devices in a block chain workflow is seen to be limited to them serving only a secure data interface function i.e. embedded devices are relegated to being data sources or sinks rather than actual block chain nodes. All the corresponding block chain functions are typically performed on the cloud on their behalf. This is commonly due to limitations in memory, compute and other capabilities. There are several advantages to overcoming this limitation. The invention presented describes techniques and workflows that do so. The invention presented describes how to overcome limitations due to processing power, memory, local storage, loss of power, loss of communications and connectivity to one or more interfaces, etc.

In summary, [2], [3], [4] and [5] outline the need for a fast and accessible system and method for optimizing the value of distributed energy resources and as a means of maximizing the value derived, trading the generated exported energy/power to various consumers around the distributed energy source and attributing/allocating the instantaneous and continuous measured energy through described allocation methods and the process of performing the allocation in a simplified hierarchical/redundant blockchain workflow that includes an embedded blockchain network and workflow.

BRIEF SUMMARY

It is the object of the present invention to provide a method and system for allocating exported energy in a utility network. A method for allocating exported energy in a utility network comprising measuring the exported energy and a consumed energy via one or more IoT edge devices connected to a cloud computing infrastructure and coupled to one or more distributed energy resources in a community of energy consumers via a telecommunication network. Storing the measured exported energy and consumed energy on a memory coupled to a processor in the cloud computing infrastructure. Selecting one or more allocation algorithms executed by the processor based on the measured exported energy. Distributing and assigning the exported energy according to the one or more allocation algorithms selected and differentiating the community of energy consumers based on the one or more allocation algorithms selected.

In accordance with an aspect of the invention, there is provided a system for allocating exported energy in a utility network comprising one or more IoT edge devices connected to a cloud computing infrastructure and coupled to one or more distributed energy resources in a community of energy consumers via a telecommunication network for measuring the exported energy and the consumed energy. A processor in the cloud computing infrastructure coupled to a memory and to the one or more IoT devices for storing the exported energy and the consumed energy and one or more allocation algorithms executed by the processor selected for distributing and assigning the measured exported energy to the community of energy consumers and for differentiating the community of energy consumers.

In accordance with an embodiment of the invention, the one or more allocation algorithms is executed on a processor within the one or more IoT edge devices when the telecommunication network is no longer connected to the cloud computing infrastructure.

In accordance with an embodiment of the invention, the exported energy and the consumed energy are measured instantaneously.

In accordance with an embodiment of the invention, the memory comprises energy production database, community members profiles database and energy consumption database.

In accordance with an embodiment of the invention, one or more selection criteria of the one or more allocation algorithms comprises size of demand, historic demand, distance from a power source and type of application used for the energy consumption.

In accordance with an embodiment of the invention, the community of energy consumers comprises ranking the community of energy consumer based on the one or more selection criteria.

In accordance with an embodiment of the invention, the one or more allocation algorithms comprises proportional-to-consumption allocation, green-friendly allocation size-based allocation, historic-demand allocation and Powerflow analog allocation.

In accordance with an embodiment of the invention, the assignment of the exported energy is based on distribution calculations.

In accordance with an embodiment of the invention, the distribution of the exported energy is based on energy consumption database and energy production database.

BRIEF DESCRIPTION OF THE SEVERAL
VIEWS OF THE DRAWINGS

To easily identify the discussion of any particular element or act, the most significant digit or digits in a reference number refer to the figure number in which that element is first introduced.

DETAILED DESCRIPTION

The details of one or more embodiments of the subject matter of this specification are set forth in the accompanying drawings and the description below. Other features, aspects, and advantages of the subject matter will become apparent from the description, the drawings, and the claims.

Like reference numbers and designations in the various drawings indicate like elements.

The present invention describes a method and system for determining the optimal deployment of distributed energy resources that overcomes disadvantages inherent in the known methods and systems of deployment of distributed energy resources. The present invention provides a method and system for determining the optimal deployment of distributed energy resources more specifically, but not by way of limitation, to a fast and accessible system and method for optimizing the value of distributed energy resources. As such, the general purpose of the present invention, which will be described subsequently in greater detail, is to provide a new and improved method and system for determining the optimal deployment of distributed energy resources which has all the advantages of distributed energy resource deployment systems and methods and none of the disadvantages.

Figure 1:
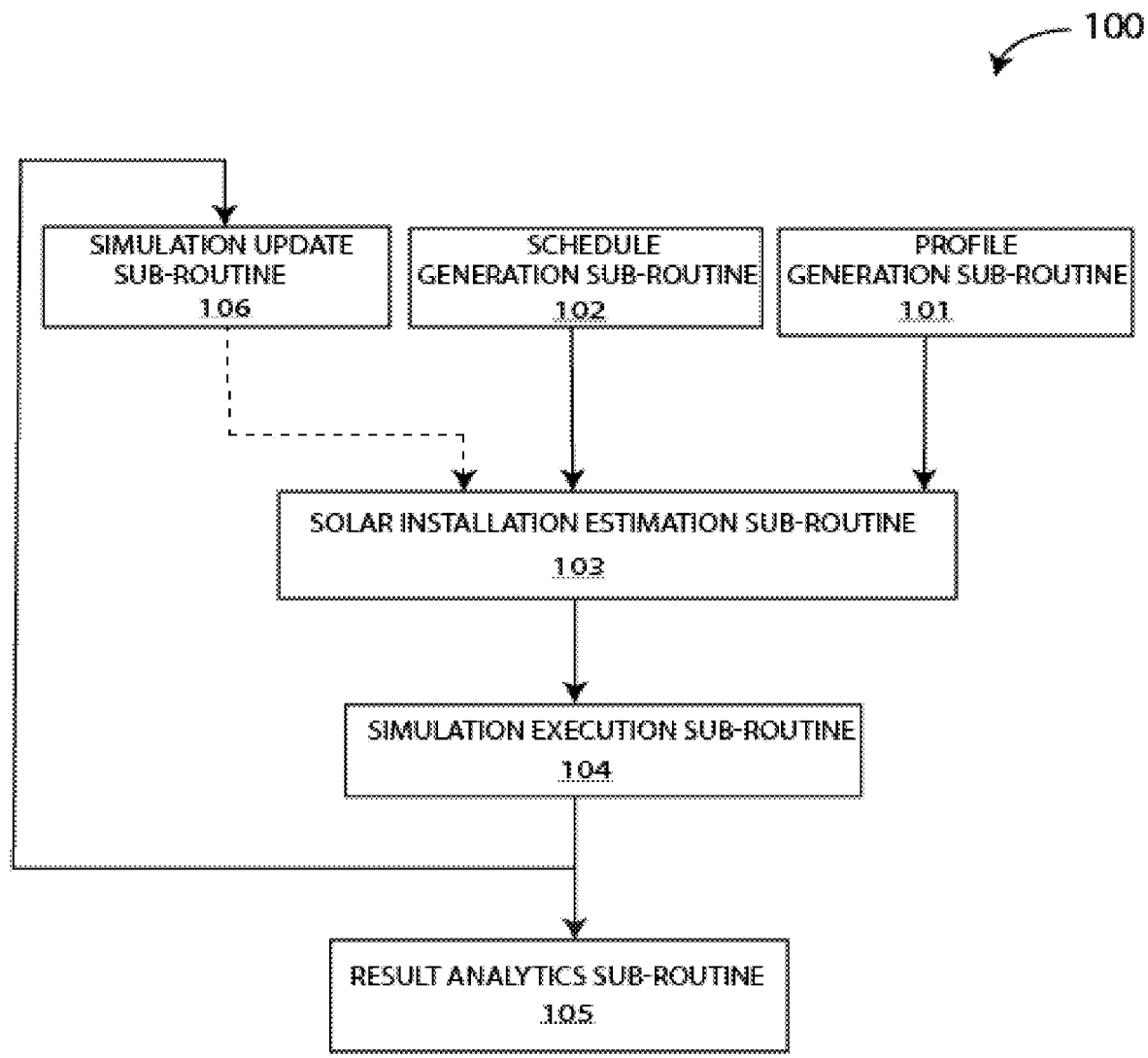
FIG. 1 illustrates the flowchart of the overall method 100 in accordance with one embodiment.

FIG. 1 illustrates the flowchart of the method for the overall simulation as in one embodiment. The method consists of 6 sub-routines executed by a processor. The profile generation sub-routine 101 uses past consumption data to generate consumption profiles for community members. The schedule generation sub-routine 102 uses past solar radiation data to generate a solar production schedule. The solar installation estimation sub-routine 103 estimates kW of solar installation needed to meet community needs based on expected consumption and given a target penetration level. The simulation execution sub-routine 104 simulates energy flow from distributed energy resources (DERs) to community members based on specified allocation method. The result analytics sub-routine 105 calculates energy bill savings for the community according to simulated energy consumption. The simulation update sub-routine 106 compares the projected results from the previous run to the observed data.

In some embodiments, the simulated energy flow is executed within a representation of a utility network topology comprising a power flow capacity, a method of connectivity, age of one or more components of the utility network topology, performance of one or more components of the utility network topology, related electronics employed within the utility network topology and a density of power flow. The inclusion of the utility network topology provides the simulation an understanding of the power flow and energy flow at various parts of the community. This results in greater accuracy in estimating the impact and value of DERs as well as being able to pinpoint the ideal physical location of DERs.

Figure 2:
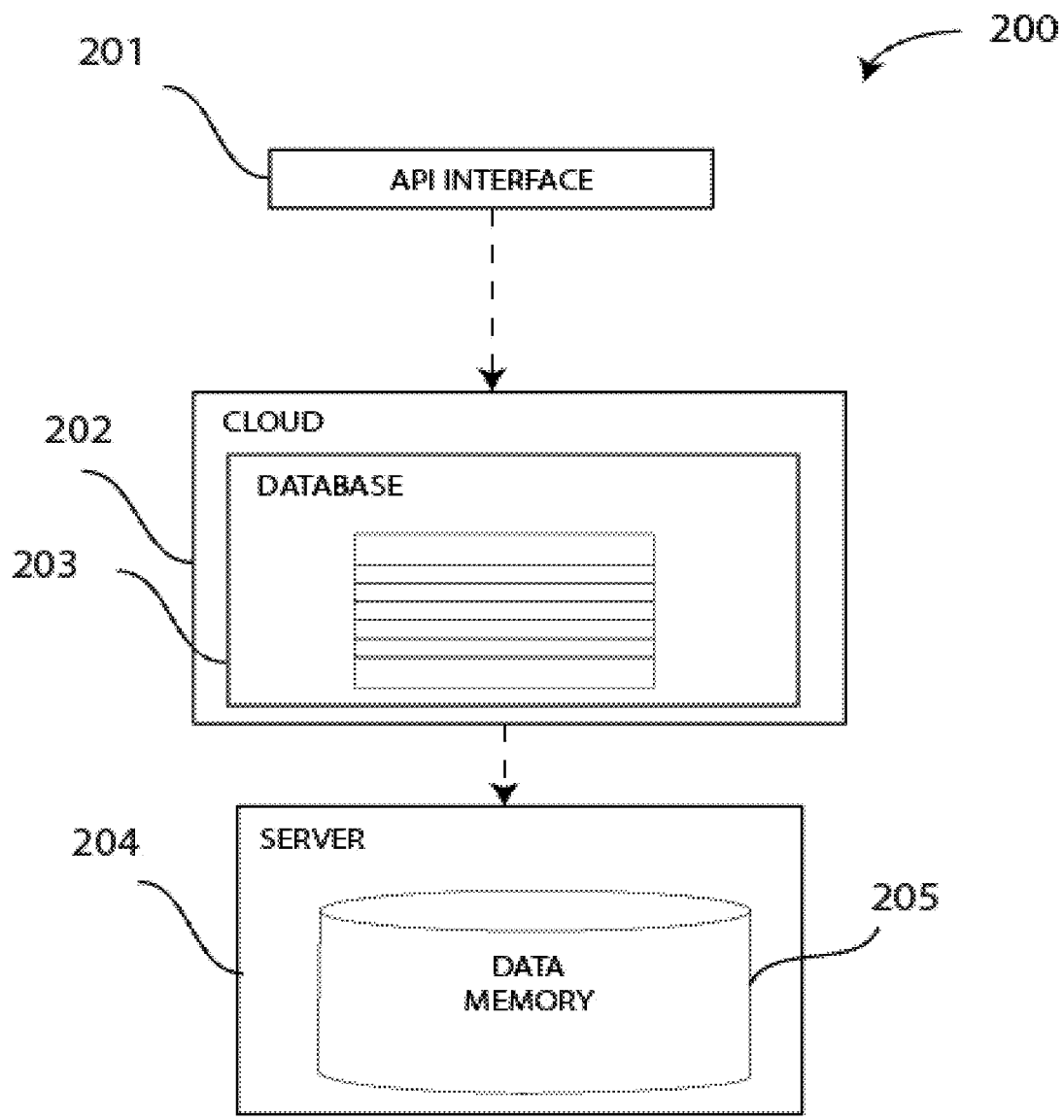
FIG. 2 illustrates a diagram of method components 200 in accordance with one embodiment.

FIG. 2 illustrates the components of this method: the application programming interface (API) 201, the cloud 202, the database 203 and its memory 205 on the server 204 as in one embodiment.

Figure 3:
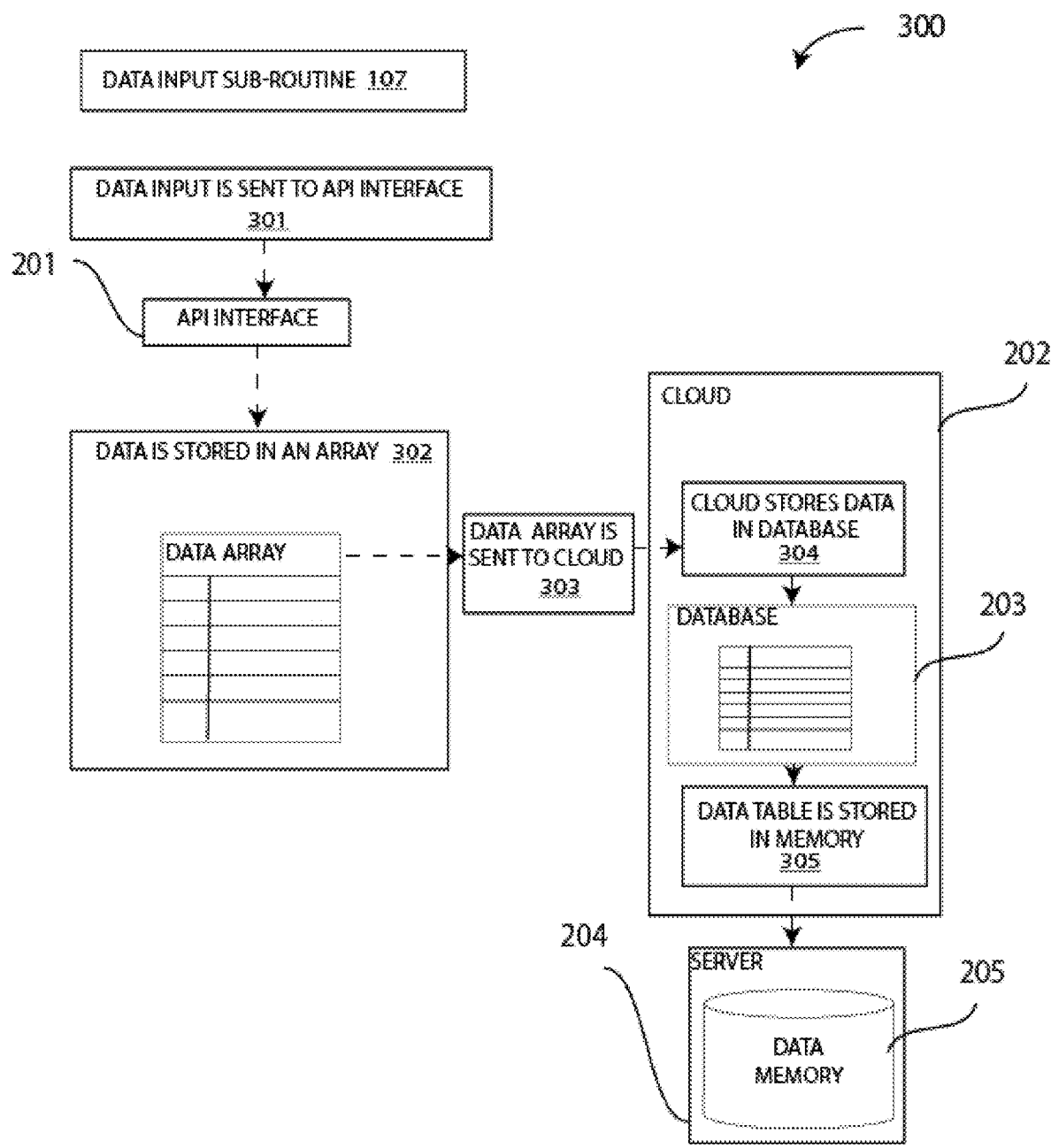
FIG. 3 illustrates the data input sub-routine 107 in accordance with one embodiment.

FIG. 3. illustrates the data input sub-routine 107 as in one embodiment. Input data is sent to the API interface 201 by 301. The API interface 201 stores the data in an array 302 and sends it to the cloud 202 in sub-routine 303. The cloud 202 stores the data in a table in the database 304, shown as 203. The table is stored in memory 305, as shown on the data memory 205 of the server 204.

Figure 4:
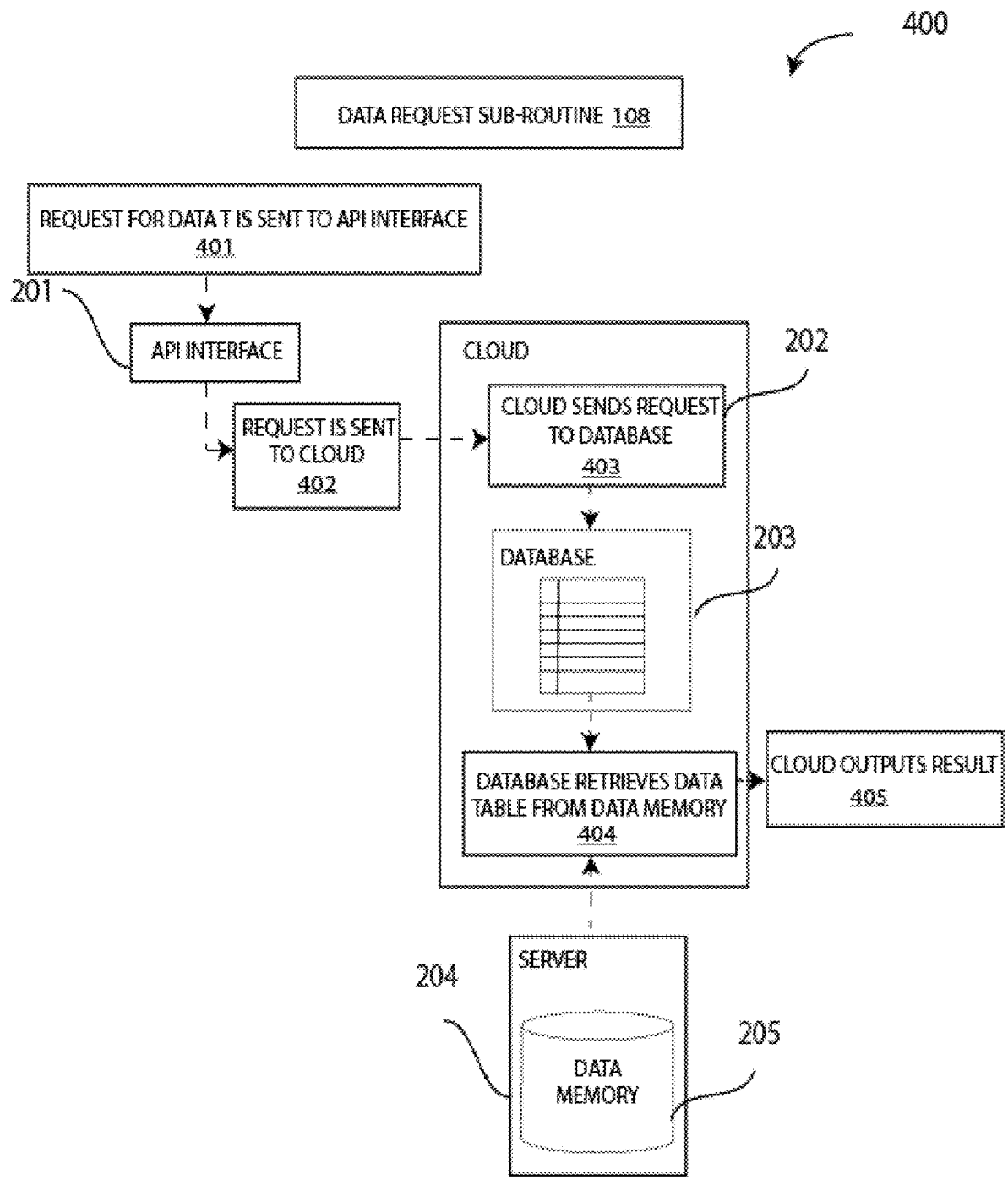
FIG. 4 illustrates the data request sub-routine 108 in accordance with one embodiment.

FIG. 4 illustrates the data request sub-routine 108 as in one embodiment. The request is sent to the API interface 201 by subprocess 401 and the API interface 201 sends the request to the cloud 202 by subprocess 402. The cloud 202 sends the request to the database 203 by subprocess 403 and the data is stored in a table. The data is retrieved from memory 205 on the server 204 by subprocess 404, and the result is outputted 405 by the cloud 202.

Figure 5:
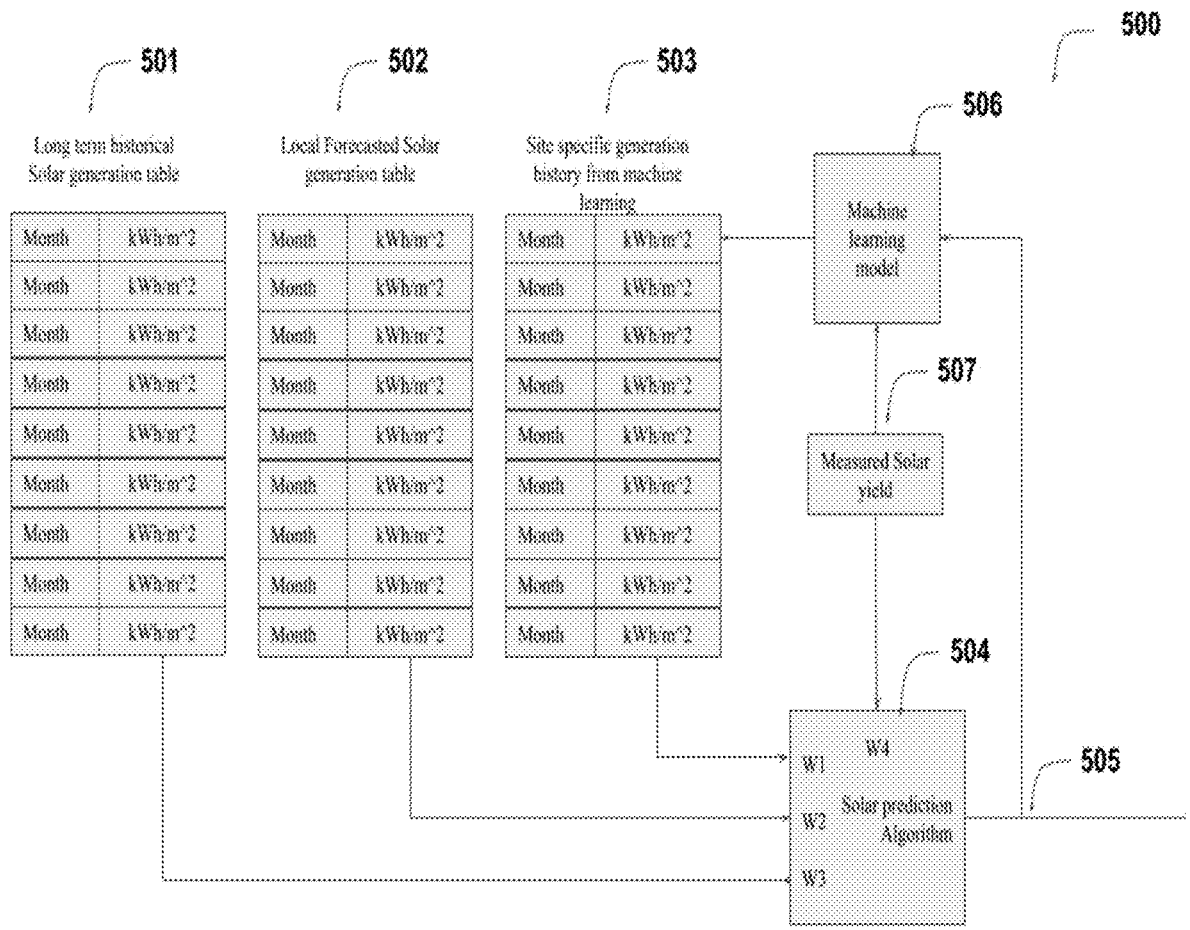
FIG. 5 illustrates the profile generation process 500 in accordance with one embodiment.

FIG. 5 shows how different sources of input data are processed together to create a predicted consumption table for the day and how the predicted value is adapted based on actual consumption data as in one embodiment. Historical long term records 501 are combined by weighted averaging with other more predictors of consumption such as a localized consumption forecast 502. A machine learning history of the member specific consumption is also created and maintained 503. When these are all combined and adapted with the actual measured consumption available in real time 507, the consumption predictor 504 can very accurately predict consumption for the given community member. The actual measured consumption is compared against the predicted output for the past interval and a correction signal is computed in the machine learning model 506 that is used to update the machine learned history. The consumption profile is sent as an output 505.

Figure 6:
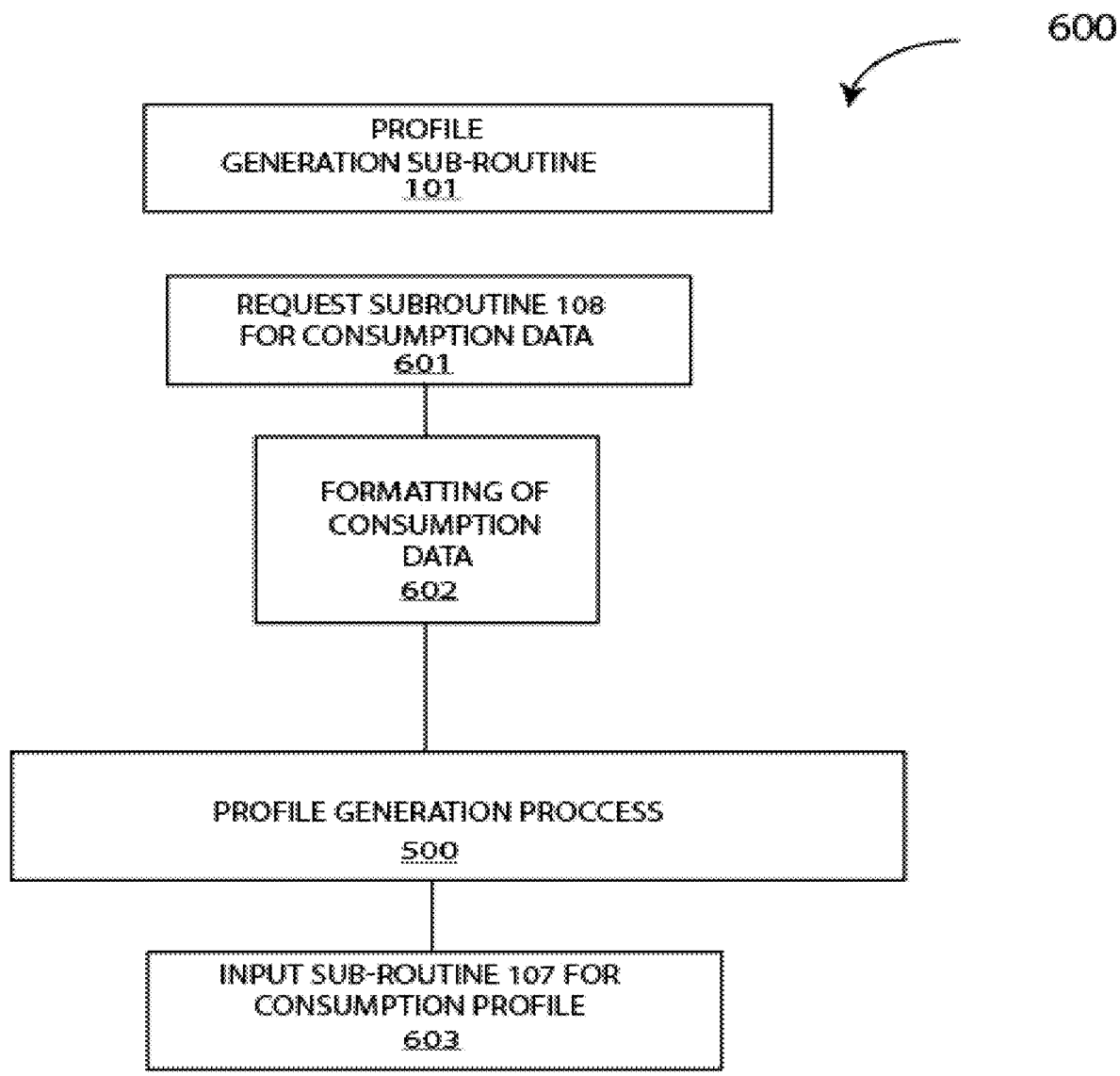
FIG. 6 illustrates the profile generation sub-routine 101 in accordance with one embodiment.

FIG. 6 illustrates the consumption profile generation sub-routine 101 as in one embodiment. This method uses sub-routine 108 to retrieve past consumption data as an input 601. This data can be for each community member, for a set of community members or for the average community member. It can be for any time frame (ex. per second, per minute, hourly, daily, or yearly). It can be on direct consumption (i.e. x kWh consumed on this day) or on average consumption (i.e. x kWh consumed for average of y days). After retrieval, the data is formatted in process 602. The consumption profile is generated using sub process 500. In the standard process, this data is generated by the IoT edge device(s). However, the community can also submit data coming from their meters. In the case where past data is not available at all, estimates can be made based on state, provincial or even national averages. Sub-routine 107 is called which outputs consumption profiles and stores them into memory 603.

Figure 7:
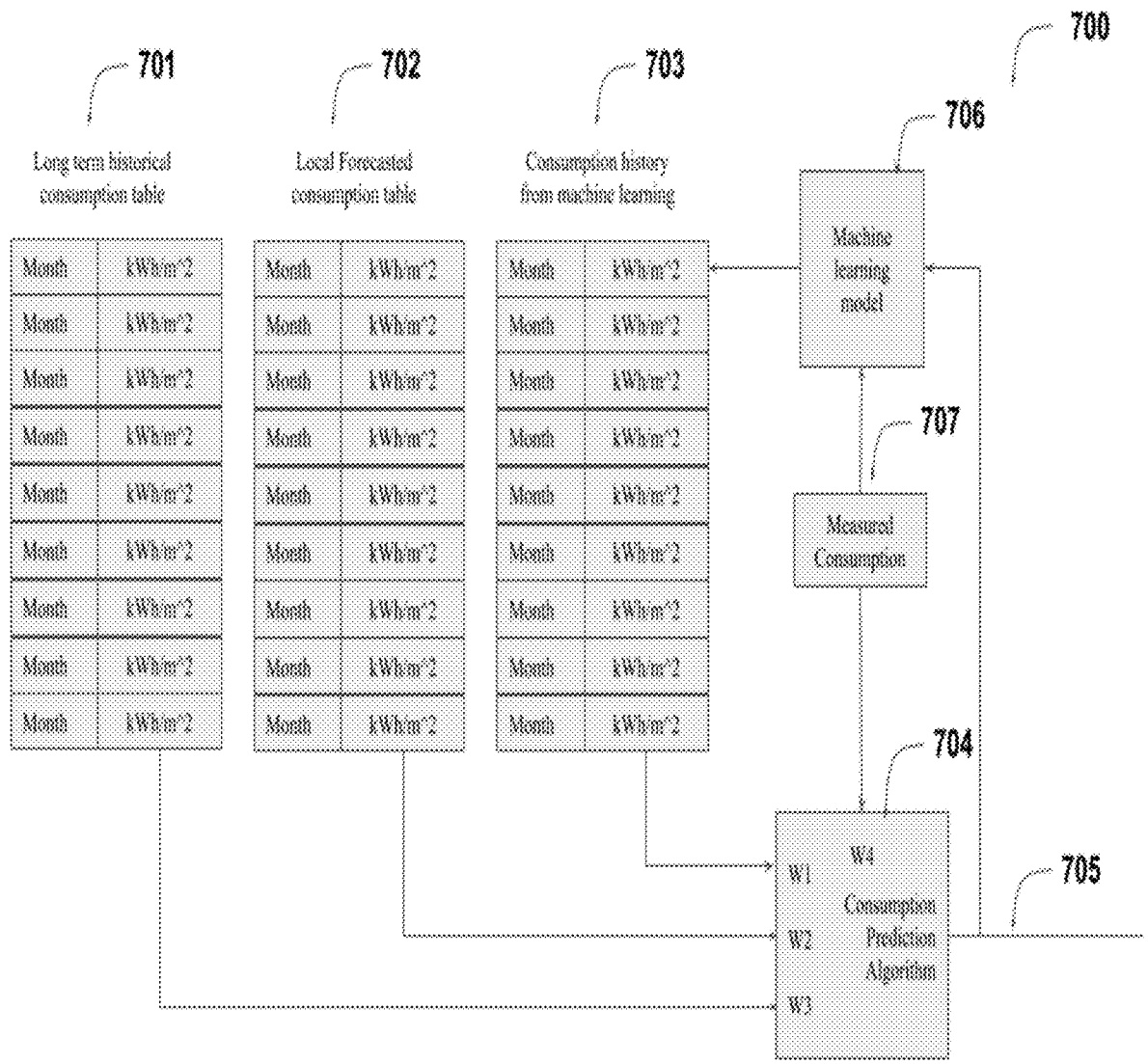
FIG. 7 illustrates the schedule generation process 700 in accordance with one embodiment.

FIG. 7 shows how different sources of input data are processed together to create a predicted solar yield table for the day and how it is the predicted value is adapted based on actual production data as in one embodiment. Historical long term records 701 are accurate in predicting long term average energy yields but not at predicting solar power or energy for a location on a given day. This data is combined by weighted averaging with other more reliable predictors of local situation such as a localized solar energy forecast 702. A machine learning model 706 of the site specific performance is also created and maintained 703. The model incorporates measured solar yield and predicted output for one or more past intervals. When these are all combined and adapted with the actual measured solar yield available in real time 707, the solar predictor 704 can very accurately predict the solar production table for the given site. The actual measured yield is compared against the predicted output for the past interval and a correction signal is computed in the machine learning model 706 that is used to update the machine learnt history. The solar predictor output is sent as an output 705.

machine learning incorporates measured solar yield and predicted output for one or more past intervals.

Figure 8:
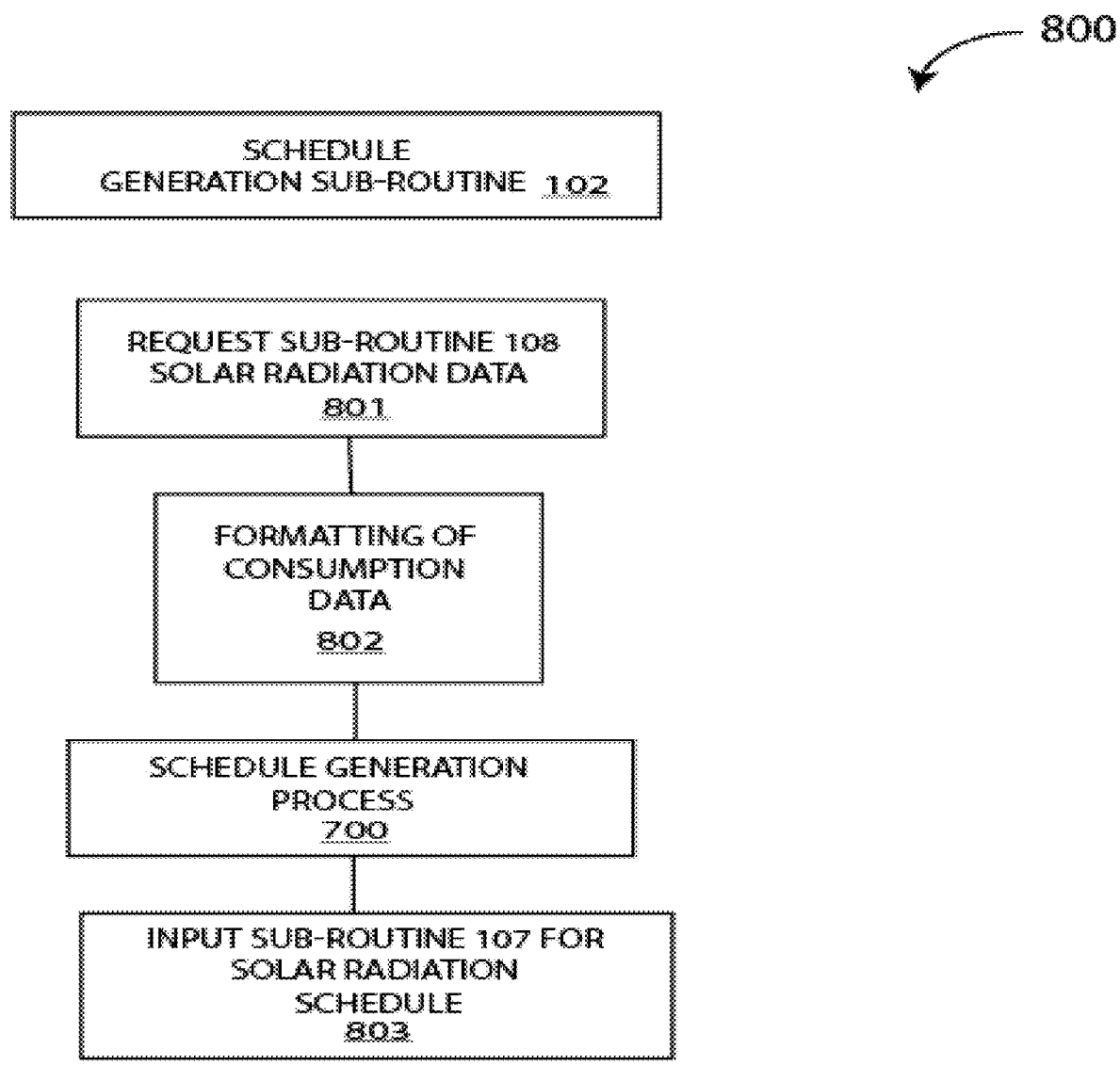
FIG. 8 illustrates the solar radiation schedule generation sub-routine 102 in accordance with one embodiment.

FIG. 8 illustrates the solar radiation schedule generation sub-routine 102. The sub-routine 102 calls request sub-routine 108 to retrieve site-specific solar radiation data 801 as input. Solar radiation data 801 is provided for some time frame (ex. for second, minute, day, month, or year). The data can be on exact solar radiation (i.e. location received x per $m^2$ on this day) or on average solar radiation (i.e. location received x per $m^2$ for average of y days). It can account for the location's position in relation to the sun or not. It can account for the angle of the solar panels or not. The method also needs data on the start of sunrise and end of sunset for the location. This data can be provided as an average for a certain time period (ex. January 1st averaged a sunrise time of x over the past fifteen years) or for a single instance (ex. January 1st sunrise was x in year y). The data is then formatted 802. It calls on subprocess 700 to generate a time-series for solar production hereby referred to as solar production schedule. Solar radiation schedule is stored in memory 803 by calling sub-routine 107.

Figure 9:
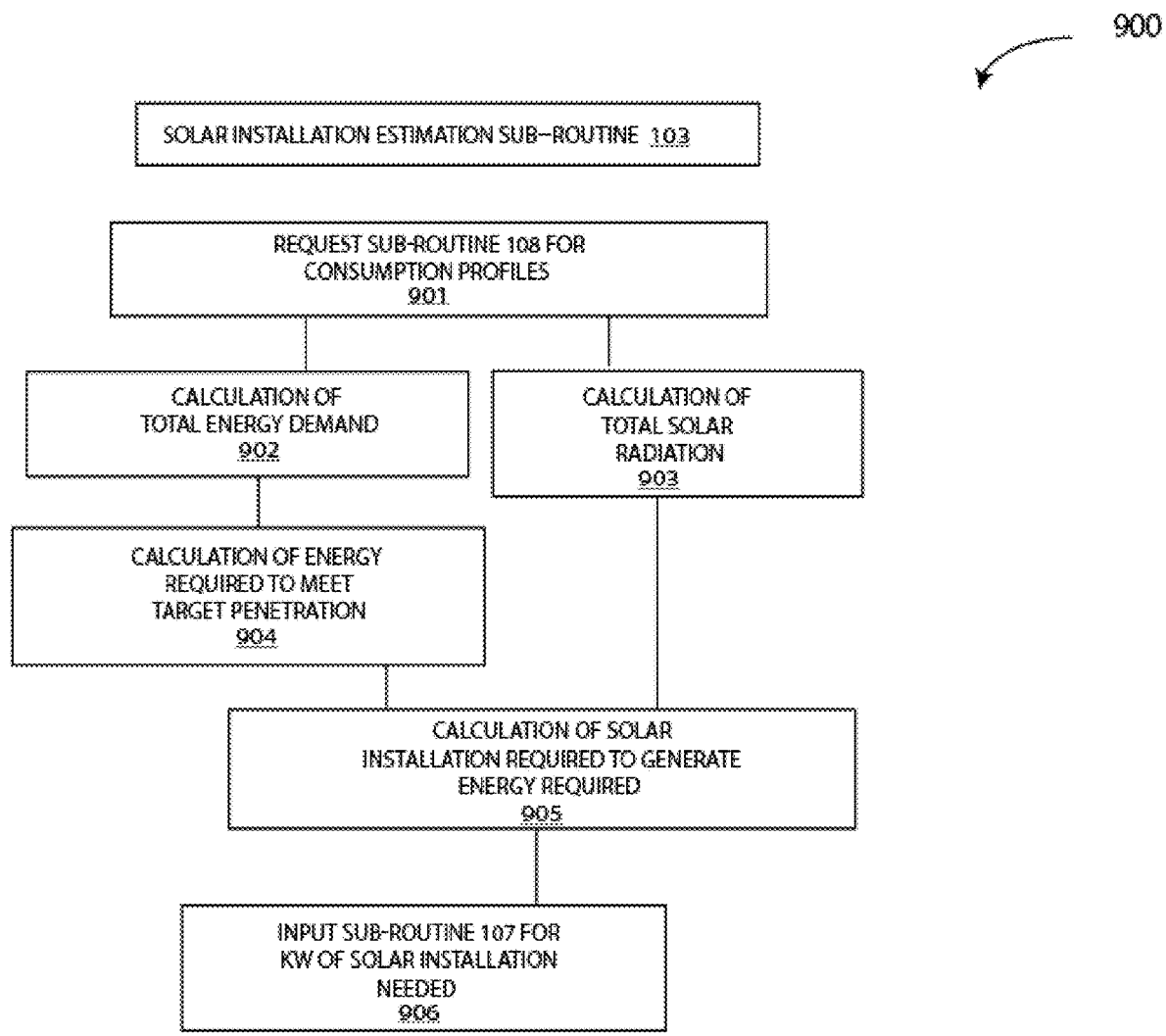
FIG. 9 illustrates the solar installation estimation sub-routine 103 in accordance with one embodiment.

FIG. 9 illustrates the solar installation estimation sub-routine 103 as in one embodiment. The sub-routine 103 estimates kW of solar installation needed to meet community needs based on expected consumption and given a target penetration level. The sub-routine 103 retrieves the consumption profile of community members in subprocess 901 by calling sub-routine 108 and uses it as an input. The method calculates the overall demand in subprocess 902 for the community by iterating through the consumption profiles and adding up all the entries. The method calculates the energy the solar installation would need to generate to reach the specified penetration level in subprocess 904. Then it calculates the size of solar PV installation that would deliver the desired penetration level in subprocess 905 given the expected solar radiation received in the region (calculated in subprocess 903). Sub-routine 107 is called to store the solar installation information in memory 906. So, Energy requirement=estimated overall demand×target penetration (1)

Number of solar panels needed=Energy requirement/ (Total expected solar radiation per $m^2$×solar panel efficiency per $m^2$) (2)

Figure 10:
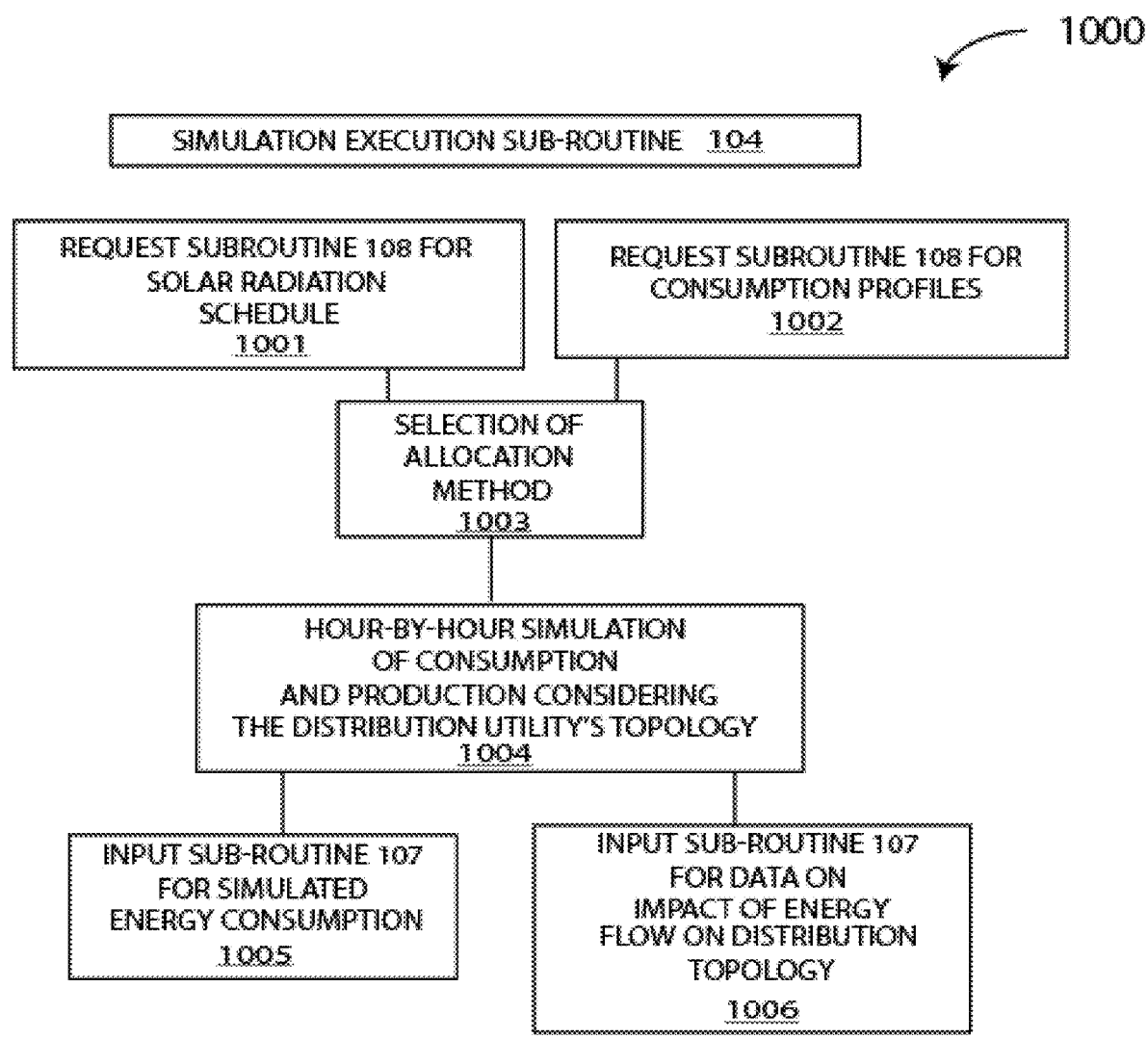
FIG. 10 illustrates the simulation execution sub-routine 104 in accordance with one embodiment.

FIG. 10 illustrates the simulation execution sub-routine 104 as in one embodiment. The sub-routine 104 calls sub-routine 108 to retrieve the solar radiation schedule in process 1001 and the consumption profiles in process 1002 from the consumption profiles in memory. Then it selects an allocation method in process 1003. After, it simulates the year hour by hour in process 1004, generating and distributing energy based on the kW of the solar installation, the solar radiation schedule for the community's location and the distribution utility's topology 1006. It outputs various data points regarding the flow of energy in the distribution topology (ex. errors, instances of strained resources, heatmap) and calls sub-routine 107 to store it in memory. It also outputs data on energy consumption and production 1005 and calls sub-routine 107 to store it in memory in subprocess 1005.

Figure 11:
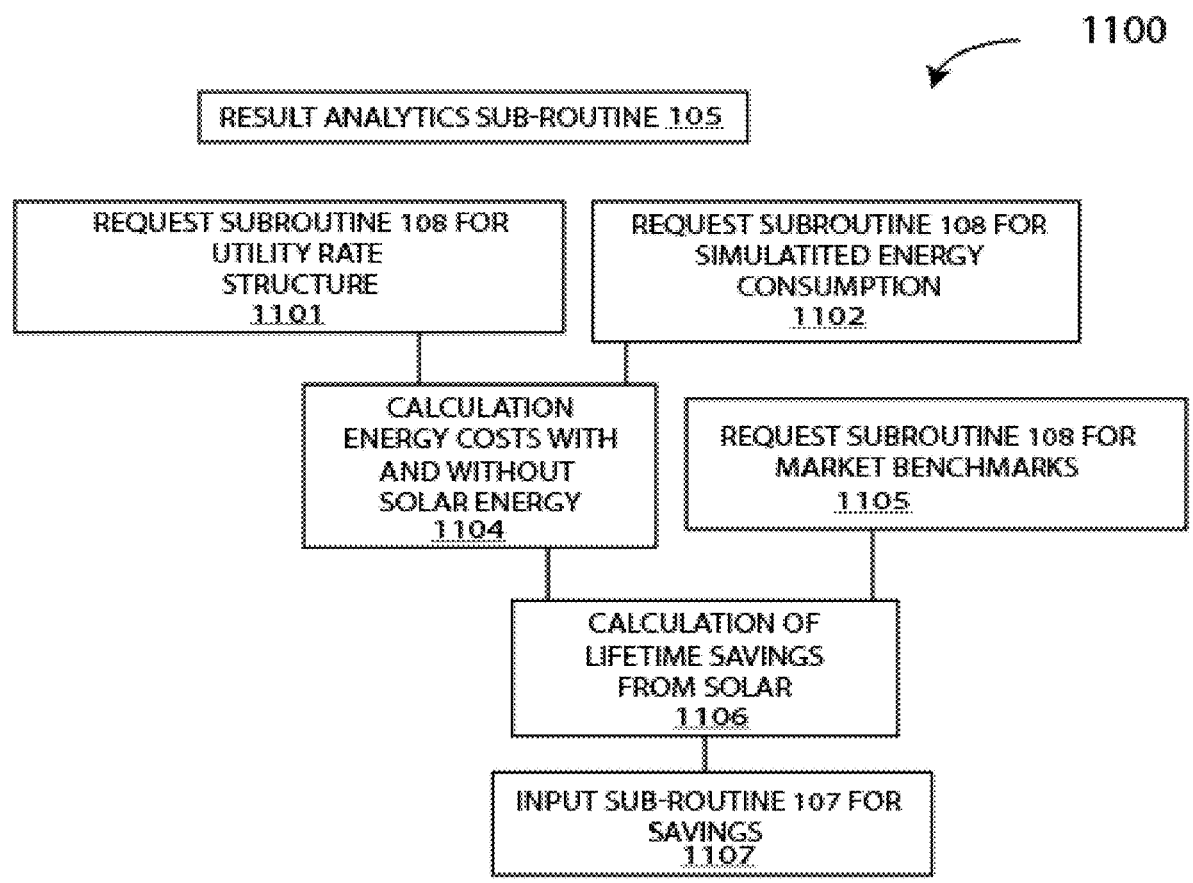
FIG. 11 illustrates the results analytics sub-routine 105 in accordance with one embodiment.

FIG. 11 illustrates the results analytics sub-routine 105 as in one embodiment. The sub-routine 105 calculates the cost-benefit of different solar penetrations. The sub-routine 105 receives the location's utility rate structure 1101 from utility rate structure memory by calling sub-routine 108 in subprocess 1101. Then it retrieves the simulated energy consumption from memory by calling sub-routine 108 in subprocess 1102. It calculates the traditional energy bill for the total kW consumed with and without the energy coming from solar subprocess 1104. The method calculates the difference between the two to get total savings. The market costs benchmarks are retrieved by subprocess 1105. Then it calculates total savings as a result of having the solar installation for a year and multiplies that by expected lifetime to get expected savings in subprocess 1106 (taking into account degradation of solar panels). It subtracts the cost of solar installation from that to get total life-time savings and saves it in memory by calling sub-routine 107 in subprocess 1107.

Figure 12:
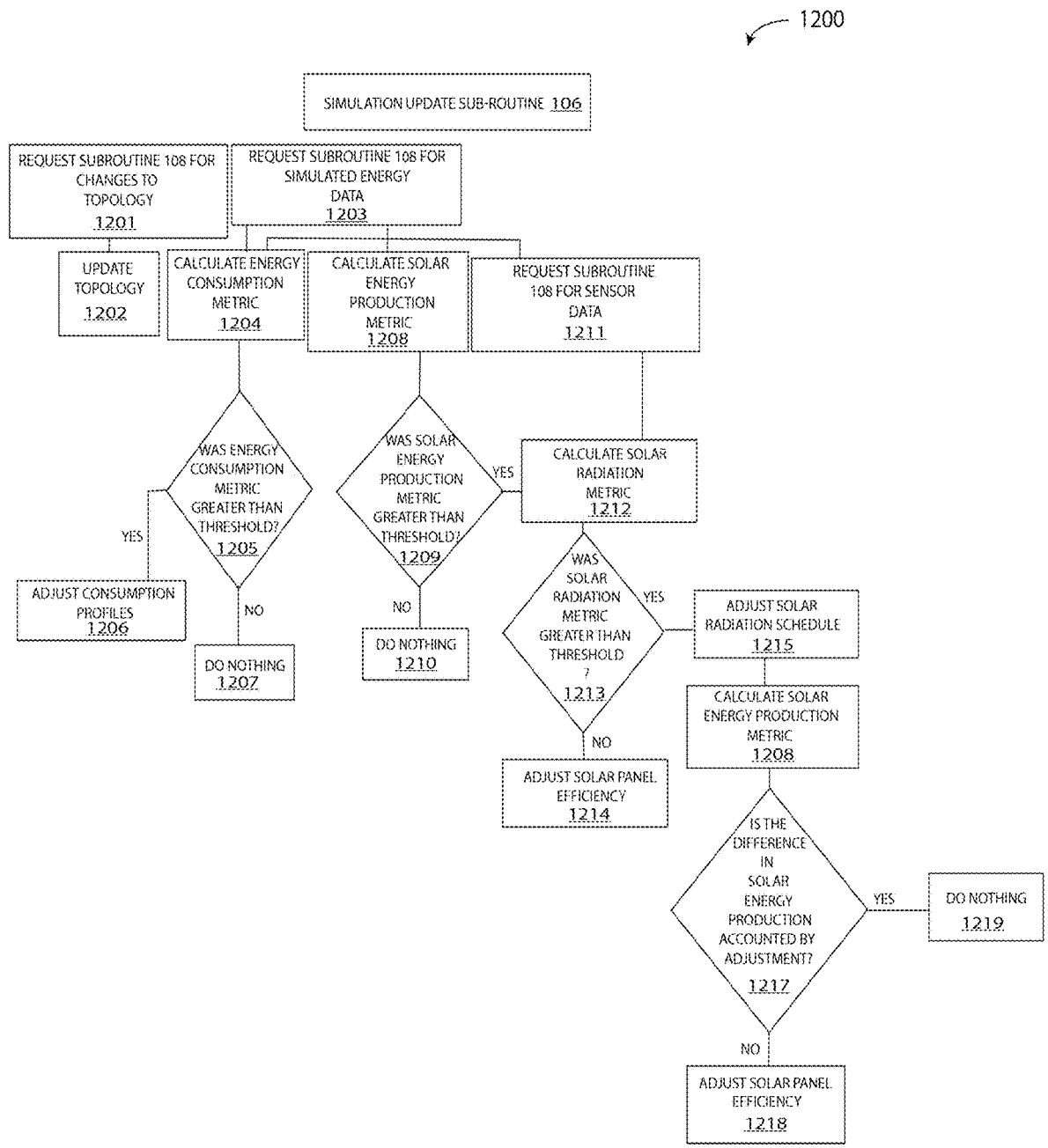
FIG. 12 illustrates the simulation update sub-routine 106 in accordance with one embodiment.

FIG. 12 illustrates optional configuration update sub-routine 106 as in one embodiment. First the sub-routine retrieves changes to the topology since the last run by calling sub-routine 108 in subprocess 1201 and updates its configuration accordingly in subprocess 1202. Then it retrieves simulated energy data in subprocess 1203 and sensor data in subprocess 1211 by calling sub-routine 108. It compares actual penetration level in the period since the last run with projected penetration level and gives a metric for the difference in subprocess 1208. It checks this metric for a threshold of difference in subprocess 1209. If it does not find a significant difference, it does nothing in subprocess 1210. If it finds a significant discrepancy, it compares projected solar radiation with received solar radiation and calculates a metric for the difference in subprocess 1212. It checks this metric for a threshold of difference in subprocess 1213. If it finds that solar radiation received was not different from projections, it adjusts panel efficiency in subprocess 1214. If it finds that solar radiation received was different from projections, it adjusts the solar radiation schedule in subprocess 1215. It calculates the metric for difference in production again in subprocess 1208. Then it checks whether the adjustment is enough to account for the difference in subprocess 1217. If it finds that this adjustment is enough to account for the difference in production, it does nothing in subprocess 1218. Otherwise, it adjusts the number of solar panels in subprocess 1219. It also checks whether actual consumption was different from projected consumption and gives a metric for the difference in subprocess 1204. It checks this metric for a threshold of difference in subprocess 1205. If it finds that consumption was not significantly different than projected, it does nothing in subprocess 1207. If it finds that there was a significant difference, it updates the consumption profiles in subprocess 1206.

In the case where the simulator is used for a one-time calculation, the simulator performs these sub-routines once, omitting sub-routine 106. In the case where it is used as an iterative process, it performs these sub-routines multiple times. For the first round, the calculation is exactly the same as it would be for a one-time run. For subsequent rounds, it first performs the additional sub-routine of comparing the projected results from the previous run to the observed data.

This representation of costs and benefits for the community allows for simulation of value flow from wholesale all the way to retail. Using information that end-utility and communities already have, data collected by our IoT edge device and our original workflow, the method presented is able to determine the optimal deployment of distributed energy resources (DERs).

Figure 13:
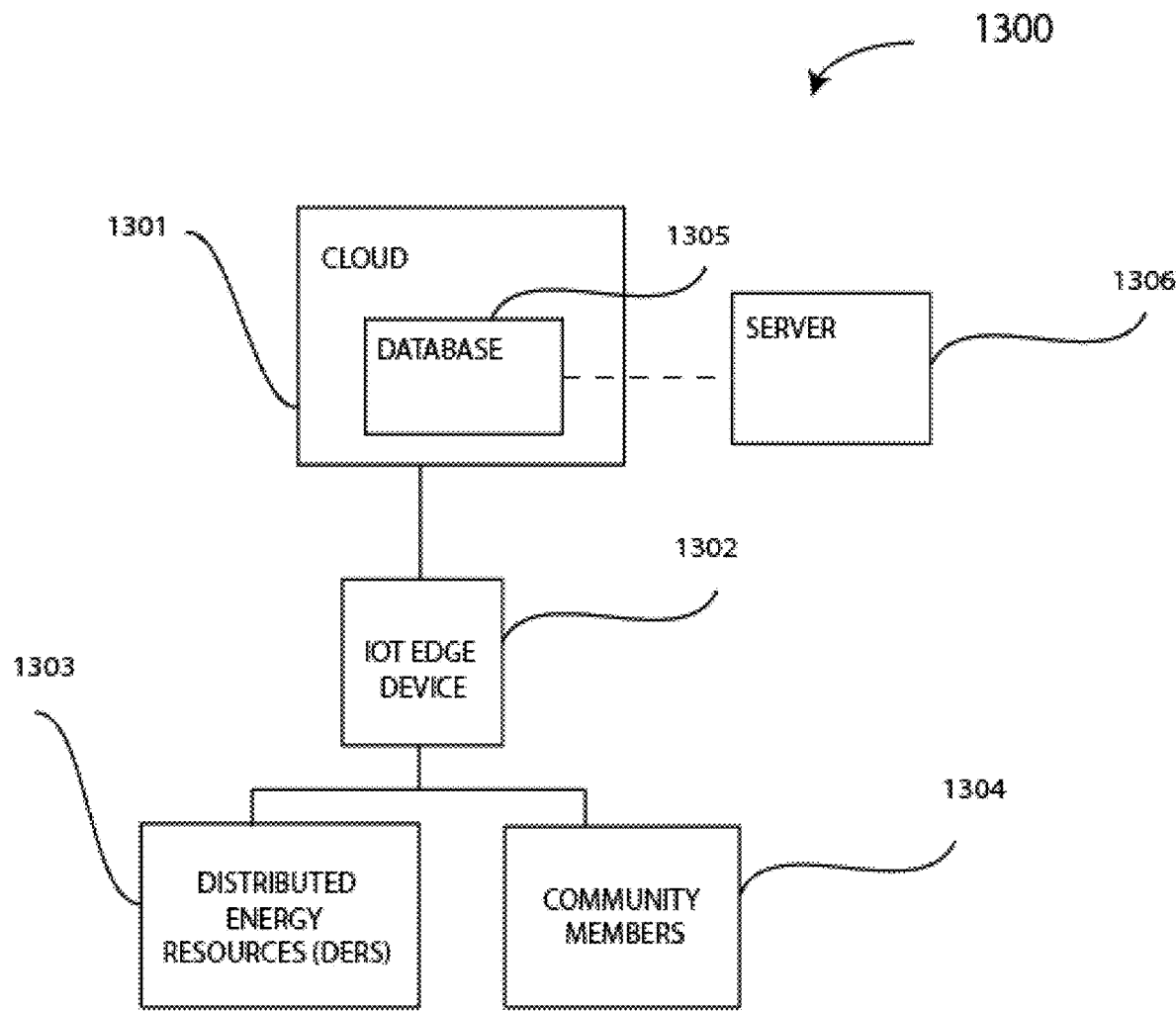
FIG. 13 illustrates a diagram of method components 1300 in accordance with one embodiment.

FIG. 13 illustrates a diagram of method components 1300 as in one embodiment. The IoT edge device 1302 is connected to the community's distributed energy resources (DERs) 1303 and to the community members 1304 and links them to the cloud 1301. The cloud 1301 contains the database 1305 which is connected to an external server 1306.

Figure 14:
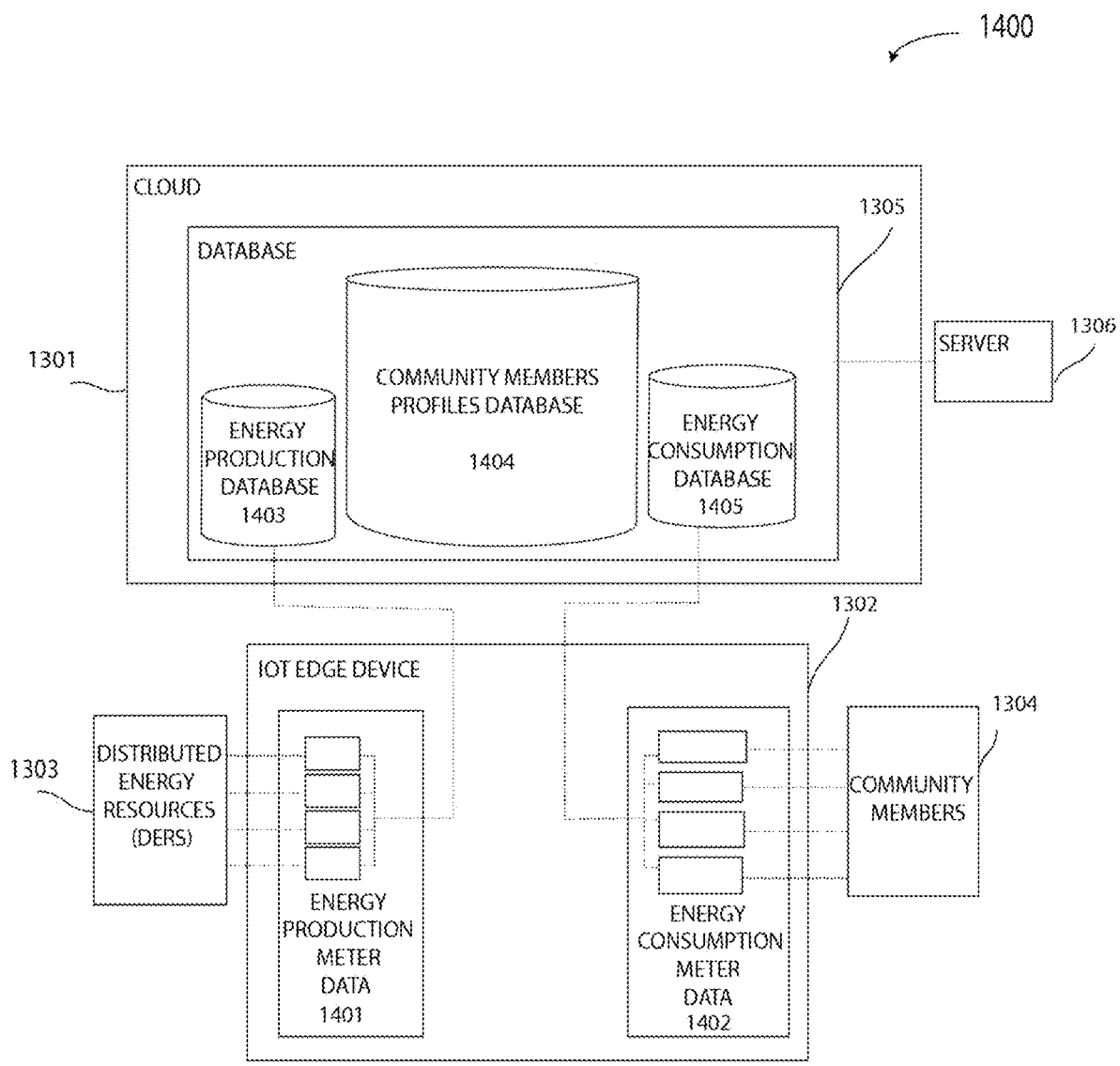
FIG. 14 illustrates the flow of data among the various components of this method 1400 in accordance with one embodiment.

FIG. 14 illustrates the flow of data among the various components of this method as in one embodiment. The community members 1304 have profiles 1404 in the cloud 1301. Each profile in the community members profiles database 1404 contains information pertinent to the allocation selection criteria for a community member. These include, by are not limited to, historic demand, type of use and distance from power source. The cloud 1301 also receives sensor data from IoT edge device(s) 1302 on energy production 1401 from DERs 1303 and consumption 1402 from community members 1304 and stores it in their databases, 1403 and 1405 respectively, which is part of the larger database 1305 which is connected to an external server 1306.

As per above, in the standard case, the distribution calculations are made in a telecommunication network such as the cloud 1301. In times where the IoT edge device 1302 is disconnected from the cloud 1301, the IoT edge device 1302 can either record and allocate energy or rely on a special device configured for this purpose. In the case where connectivity is lost in a community where there are multiple IoT edge devices 1302, each IoT edge device 1302 records and allocates energy for the subset of community members to which it is connected. When connection is re-established, the records are forwarded to the cloud 1301 and reconciled. In other embodiments, other devices in the art may be employed for recording and allocating energy for the subset of community members that lose connectivity to the cloud 1301.

Figure 15:
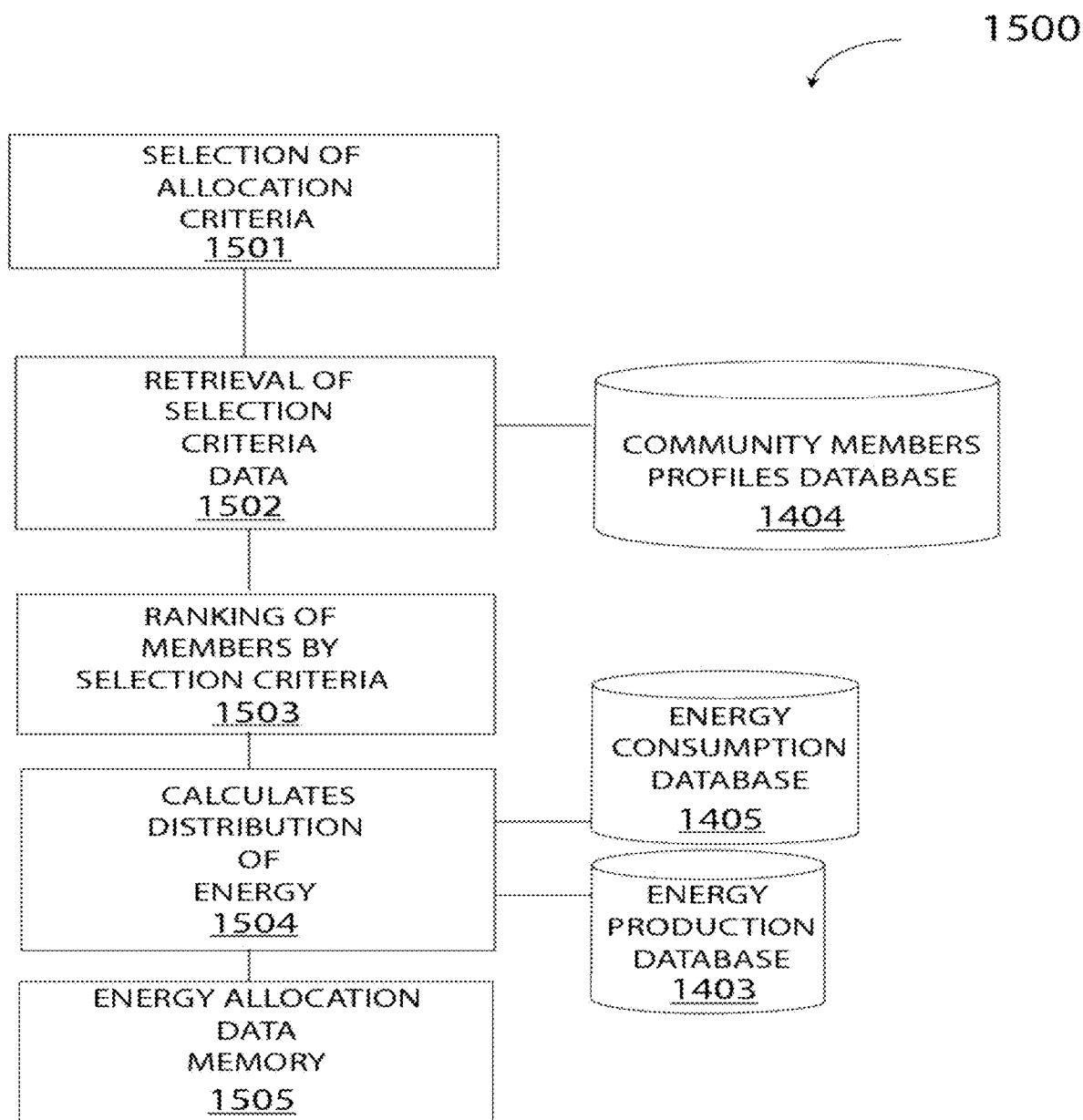
FIG. 15 illustrates the flowchart of the allocation method 1500 in accordance with one embodiment.

FIG. 15 illustrates the flowchart of the allocation method 1500 as in one embodiment. Once given the user's selection of allocation method 1501, the algorithm retrieves information on the selection criteria 1502 from the profile of community members 1404, ranks the community members by the selection criteria 1503 and retrieves energy consumption data 1405 and energy production data 1403 from memory and then assigns the energy accordingly through distribution calculations 1504. It records this information in memory 1505.

The allocation method 1501 is commensurate with a driving principle which aims for some desired characteristic of distribution.

In the case of Size-based allocation, the selection criterion is size of demand. The community members are ranked by the size of their demand (ascending or descending), and the community member with the highest rank (i.e. the smallest (ascending) or biggest (descending) demand) for the given period of time has its demand met first. The second highest is next. This continues until there is no more energy left or until every community member has their needs met.

Example: Case where 4 kWh of energy is assigned according to Size-based allocation (smallest first).

| Community Member | Size of Demand | Rank | Energy assigned |
|---|---|---|---|
| 1 | 2 kWh | 2 | 1.5 kWh |
| 2 | 1 kWh | 1 | 1 kWh |
| 3 | 3 kWh | 3 | 0 kWh |
| 4 | 2 kWh | 2 | 1.5 kWh |

In the case of Historic-demand allocation, the selection criterion is previous consumption level, revised monthly, daily, hourly, or in a moving window average. The community members are ranked by the size of their historic demand (ascending or descending), and the community member with the highest rank (i.e. the smallest (ascending) or biggest (descending) demand) for the given period of time has its demand met first. The second-highest is next. This continues until there is no more energy left or until every community member has their needs met.

Example: Case where 4 kWh of energy is assigned according to the Historic-demand allocation method (biggest first).

| Community Member | Size of Historic Demand | Rank | Energy assigned |
|---|---|---|---|
| 1 | 4 kWh | 1 | 2 kWh |
| 2 | 0.5 kWh | 3 | 0 kWh |
| 3 | 4 kWh | 1 | 2 kWh |
| 4 | 2.5 kWh | 2 | 0 kWh |

In the case of Proportional-to-consumption allocation, the selection criterion is previous consumption level, revised monthly, daily, hourly, or in a moving window average. Each community member receives the proportion of the energy available that is equal to their demand's proportion of the overall demand. In the case where a community member is entitled to more energy than their level of consumption, they are assigned only the energy they consumed. The rest of the energy is distributed to the remaining members of the community in the proportional fashion. This continues until there is no more energy left or until every community member has their needs met.

Example: Case where 4 kWh of energy is assigned according to the Proportional-to-consumption allocation method.

| Community Member | Proportion | Rank | Energy assigned |
|---|---|---|---|
| 1 | 25% | 2 | 1 kWh |
| 2 | 12.5% | 3 | 0.5 kWh |
| 3 | 37.5% | 1 | 1.5 kWh |
| 4 | 25% | 2 | 1 kWh |

In the case of Green-friendly allocation, the selection criterion is type of consumption. Energy is prioritized and assigned toward "green" applications, with the remaining energy following one or more of the other methods.

Example: Case where 4 kWh of energy is assigned according to the Green-friendly allocation method.

| Community Member | Green-friendly | Rank | Energy assigned |
|---|---|---|---|
| 1 | green | 1 | 2 kWh |
| 2 | not green | 2 | 0 kWh |
| 3 | not green | 2 | 0 kWh |
| 4 | green | 1 | 2 kWh |

In the case of Powerflow analog, the selection criterion is distance from DERs. The energy exported is shared among a radius of influence. Within this radius, those closest to the source of generation are ranked highest. If the energy is not consumed by that circle, it is exported to the greater network.

Example: Case where 4 kWh of energy is assigned according to the Powerflow analog allocation method.

| Community Member | Distance from source | Rank | Energy assigned |
|---|---|---|---|
| 1 | 1.5 km | 4 | 0 kWh |
| 2 | 0.9 km | 1 | 1 kWh |
| 3 | 1.2 km | 2 | 0 kWh |
| 4 | 1.1 km | 3 | 3 kWh |

Figure 16:
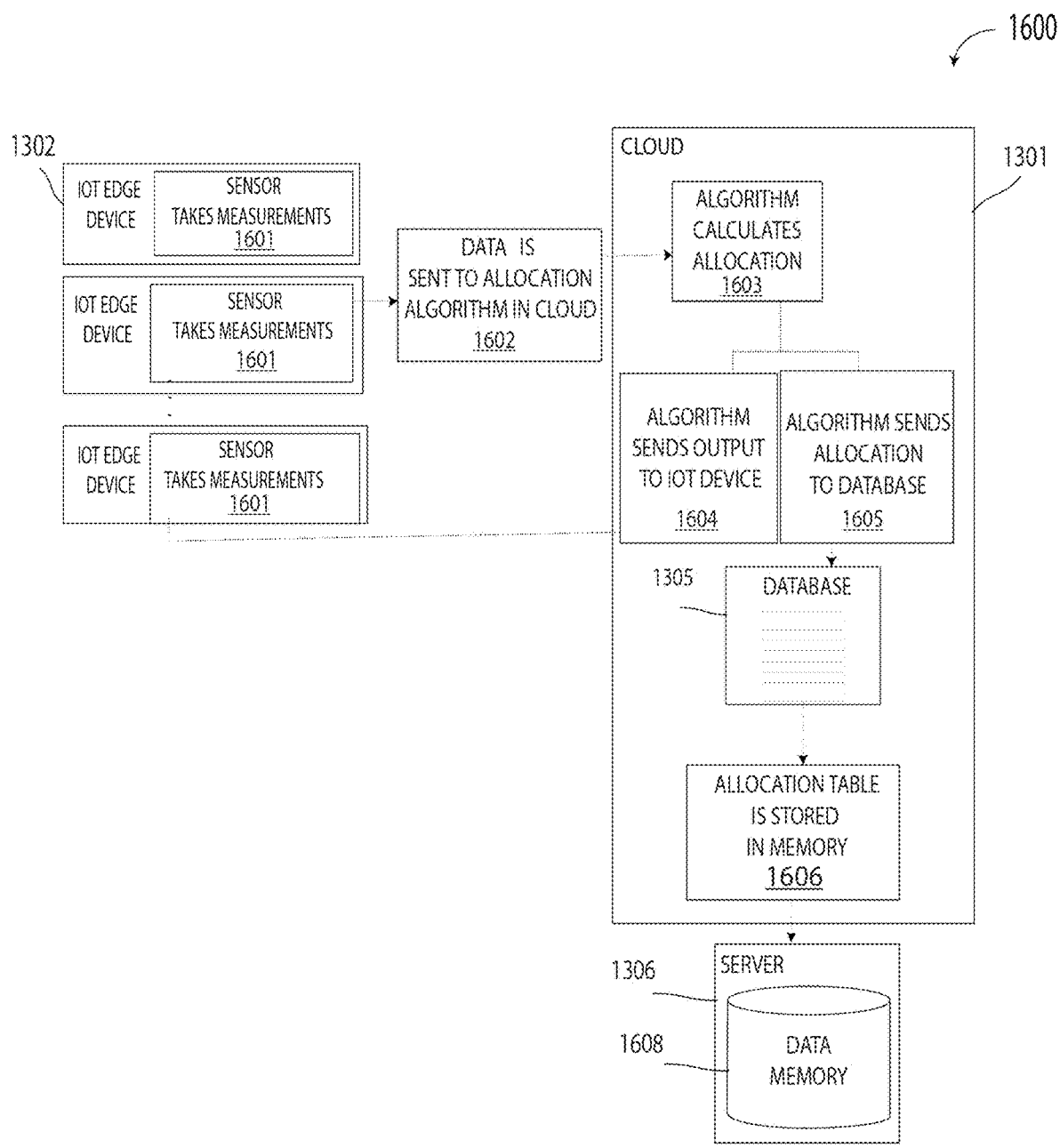
FIG. 16 illustrates the flow 1600 of data from IoT edge devices to cloud and back in accordance with one embodiment.

FIG. 16 illustrates the flow of data from IoT edge device 1302 to cloud 1301 and back as in one embodiment. IoT edge device(s) 1302 sends its sensor measurements 1601 to the allocation algorithm in the cloud 1301 in subprocess 1602. The algorithm calculates the allocation 1603, sends it back to the IoT device 1302 in subprocess 1604 and sends it to its database 1305 in subprocess 1605. The cloud 1301 contains the database 1305 which is connected to an external server 1306. The allocation table is stored in memory 1606, which is sent to the data memory 1608 within the server 1306.

While it is physically impossible to identify where exactly the electrons are flowing, it is possible to allocate such exported energy to different users in an accounting manner. For example, five homes may be connected by a wire under a single transformer. When one of these households exports energy, there is no way to represent how much exported electricity went to a specific neighbor. However, it is possible to measure how much energy is exported instantaneously, and how much energy is consumed by each neighbor, to thereby assign appropriate portions of the exported energy as having been delivered to each consuming household.

In a standard blockchain, all full nodes in the network keep a record of the entire existing set of blocks in the blockchain. This is cumbersome to implement in edge-devices as the chain grows quickly. In the implementation presented, blockchain is broken into multiple smaller chains. Nodes are associated with a group of nodes selected by specific criteria like proximity or similarity, known as a cohort. This allows us to retain the decentralized property of the blockchain while also ensuring that the chains are manageable in size. Transactions may also be recorded in more than one chain, ensuring that records are difficult to modify.

In the standard blockchain, blocks are kept in perpetuity. The proposed system utilizes blocks that are regularly pruned to ensure the node remains small. Additionally, the blocks can be stored in compressed, edited or full form according to storage capabilities. These techniques help manage node size. A series of techniques for managing workload within the nodes is implemented. Tasks are distributed in round-robin fashion among nodes such that no node is overwhelmed. Nodes are given a period of recovery after their turn. An alternative to the standard blockchain hashing functions (SHA-256 or KECCAK-256) that is lighter to compute and that has smaller outputs is implemented. This reduces computation resource requirements and storage needs.

In the proposed approach, an embedded node is a blockchain node embedded in an IoT edge-device. Embedded nodes host a copy of a blockchain and connect to other embedded nodes. These nodes receive sensor measurements from their IoT edge-device. They are responsible for turning the measurements into transactions and for sending those transactions to the appropriate channels. Nodes also participate in mining blocks. Embedded nodes have mirror nodes in the cloud 1301 called avatar nodes. These nodes are connected to the embedded nodes. They receive data from the embedded nodes and mimic the behavior of the embedded node in the cloud 1301.

Figure 17:
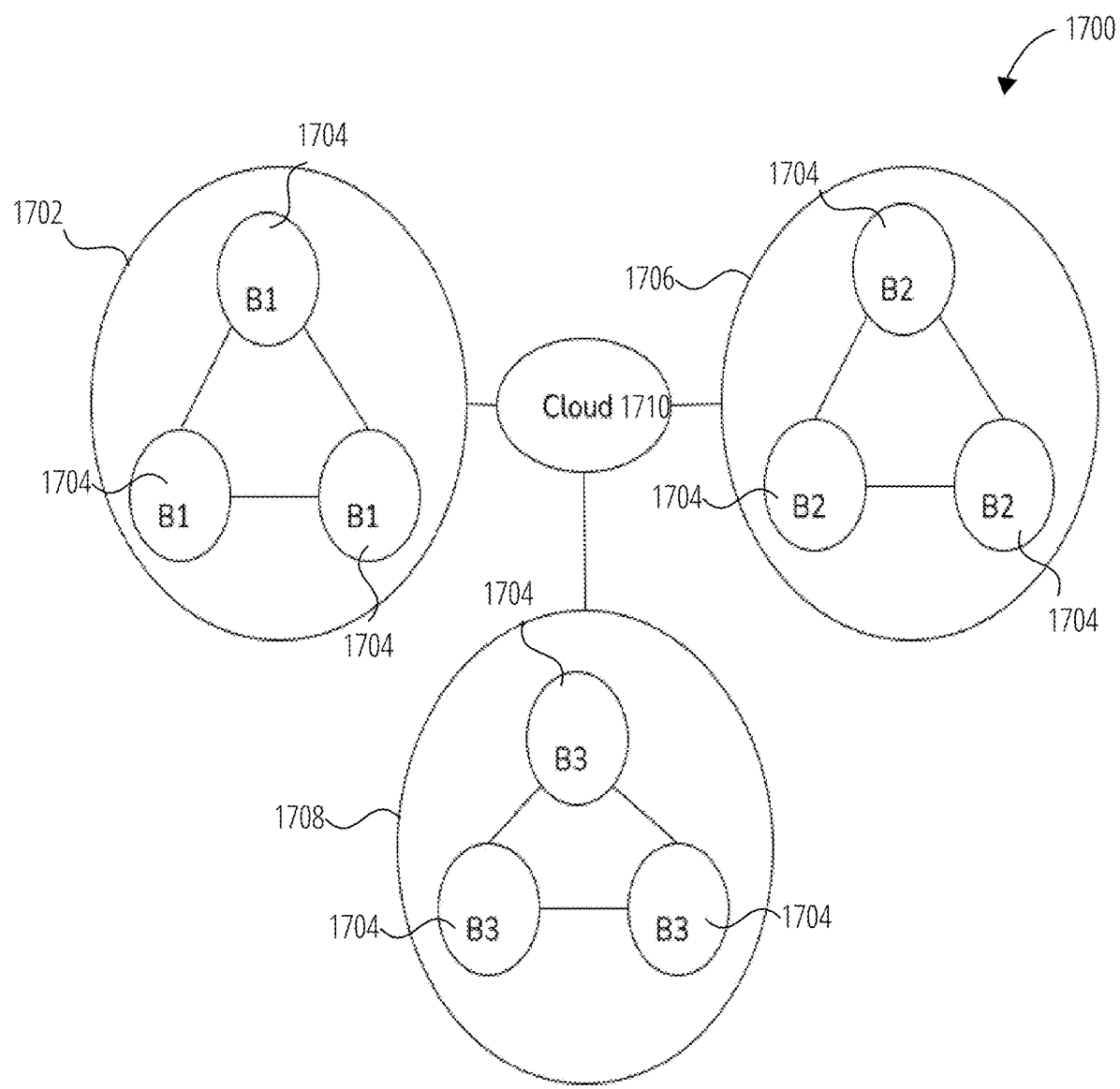
FIG. 17 illustrates a cohorts system diagram 1700 in accordance with one embodiment.

FIG. 17 illustrates a cohorts system diagram 1700 as in one embodiment. Cohorts are a set of nodes organized into a group. Nodes in the same cohort receive the same transactions and maintain the same chain of blocks. Cohorts can contain as little as two nodes and as many as all the nodes in the network. This example depicts cohort 1 1702 containing several blockchain 1704 B1, cohort 2 1706 containing blockchain 1704 B2 and cohort 3 1708 containing blockchain 1704 B3 with each of the cohorts coupled to the cloud 1710.

Figure 18:
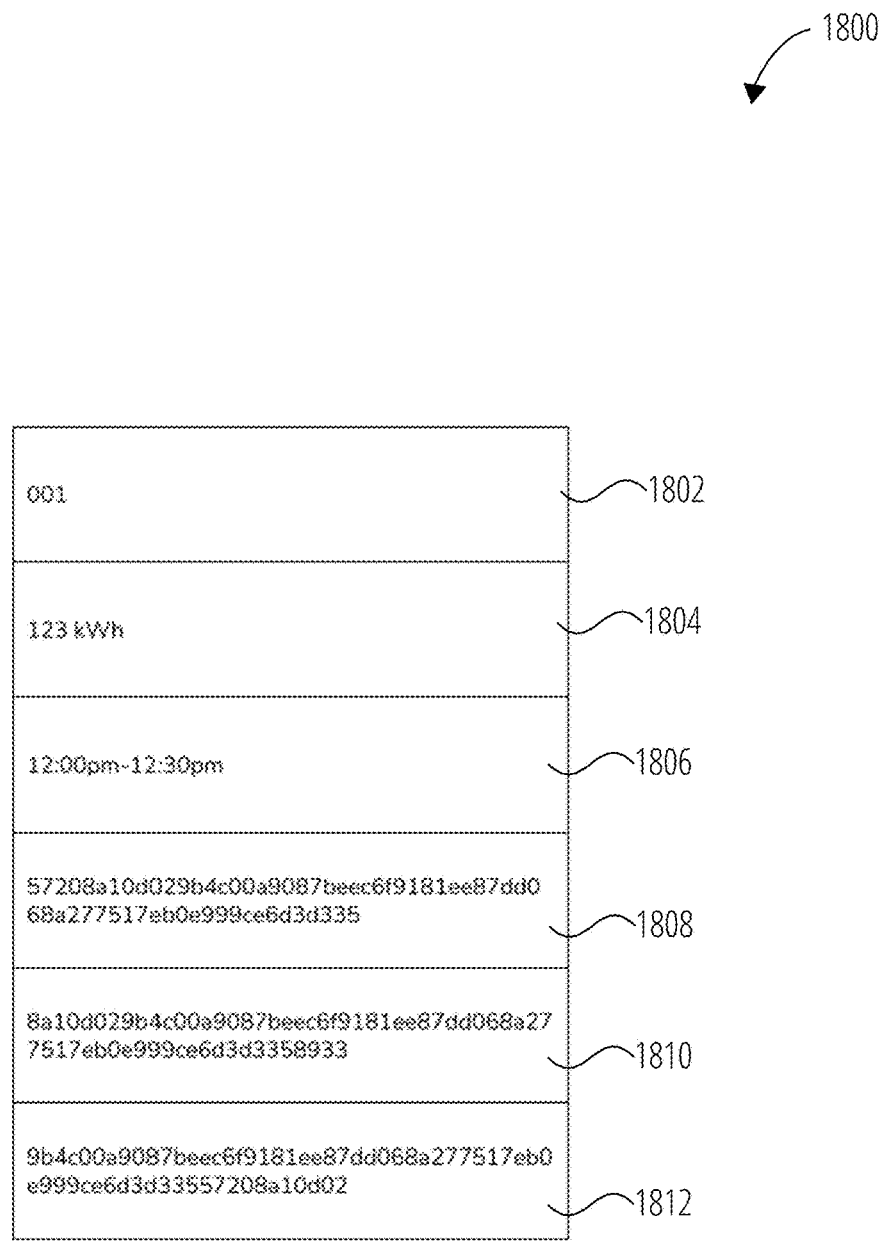
FIG. 18 illustrates a production transaction 1800 in accordance with one embodiment.

FIG. 18 illustrates a production transaction 1800 as in one embodiment. A production transaction is a log of a sensor measurement. In an extended context, this transaction could be termed outgoing transaction. It contains the following data points: the production transaction id 1802, the production sensor measurement 1804, the production time period 1806, the production token key-pair (the production public key 1808 and the production private key 1810) and the private key production output ID 1812. For example, Node 1's sensor measured x amount for time period y. Node 1 would then add this measurement to the blockchain using production token w, which proves the node is able to transact this energy.

Figure 19:
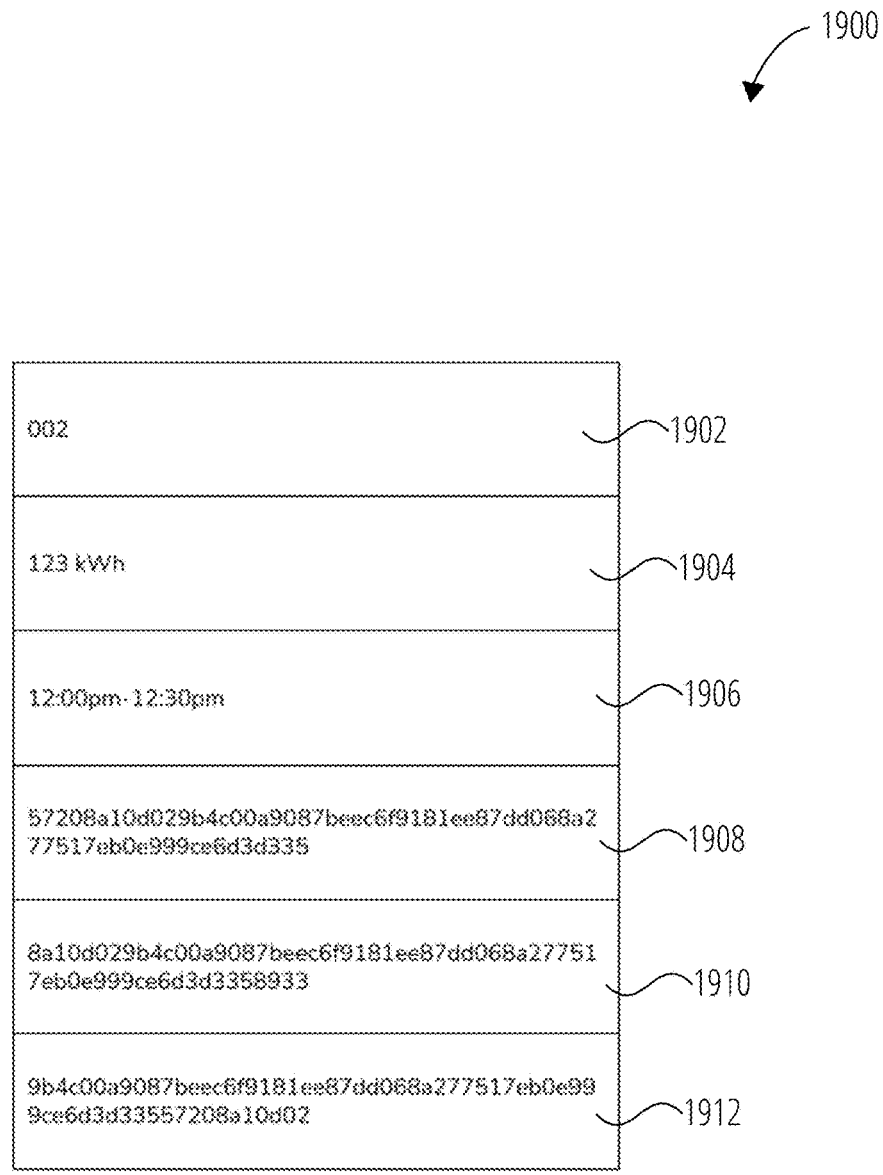
FIG. 19 illustrates a consumption transaction 1900 in accordance with one embodiment.

FIG. 19 illustrates a consumption transaction 1900 as in one embodiment. A consumption transaction is a log of a sensor measurement. In an extended context, this transaction could be termed incoming transaction. It contains the following data points: the consumption transaction id 1902, the consumption sensor measurement 1904, the consumption time period 1906, the consumption token key-pair (the consumption public key 1908 and the consumption private key 1910) and the consumption output ID 1912. For example, Node 1's sensor measured x amount for consumption in time period y. Node 1 is adding this measurement to the blockchain using production token w, which proves the node is able to transact this energy.

Figure 20:
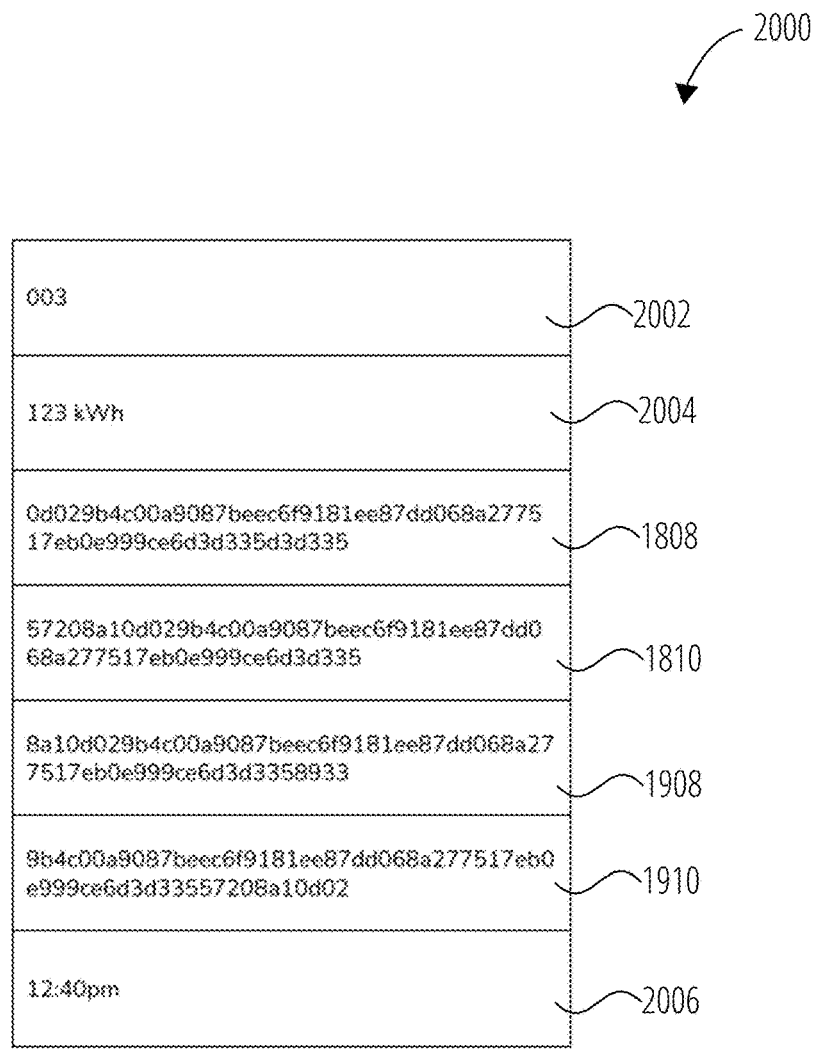
FIG. 20 illustrates an allocation transaction 2000 in accordance with one embodiment.

FIG. 20 illustrates an allocation transaction 2000 as in one embodiment. An allocation transaction is a log of energy transfer between peers. It includes the following data points: the allocation transaction id 2002, the amount transferred 2004, the production token key-pair (the production public key 1808 and the production private key 1810), the consumption token key-pair (the consumption public key 1908 and the consumption private key 1910) and the production allocation time period 2006.

Allocation transactions 2000 move ownership of production output from one node to another. There may be more than one allocation transaction 2000 needed to match the production or consumption. This is explained in the allocation process description. For example, Node 1, who produced x amount in production transaction y, wants to transfer ownership of this production to node 2 at time t to meet the node's consumption transaction z.

An addendum is an additional data point linked to a transaction. It is not part of the transaction and can be added or modified after the creation. For example, status is stored with the transaction, though it is not part of the transaction. The status attribute is set to not spent when production has not been used yet, spent when the transaction is used to offset a consumption transaction 1900, or forked when it has been split into one or more transactions.

Figure 21:
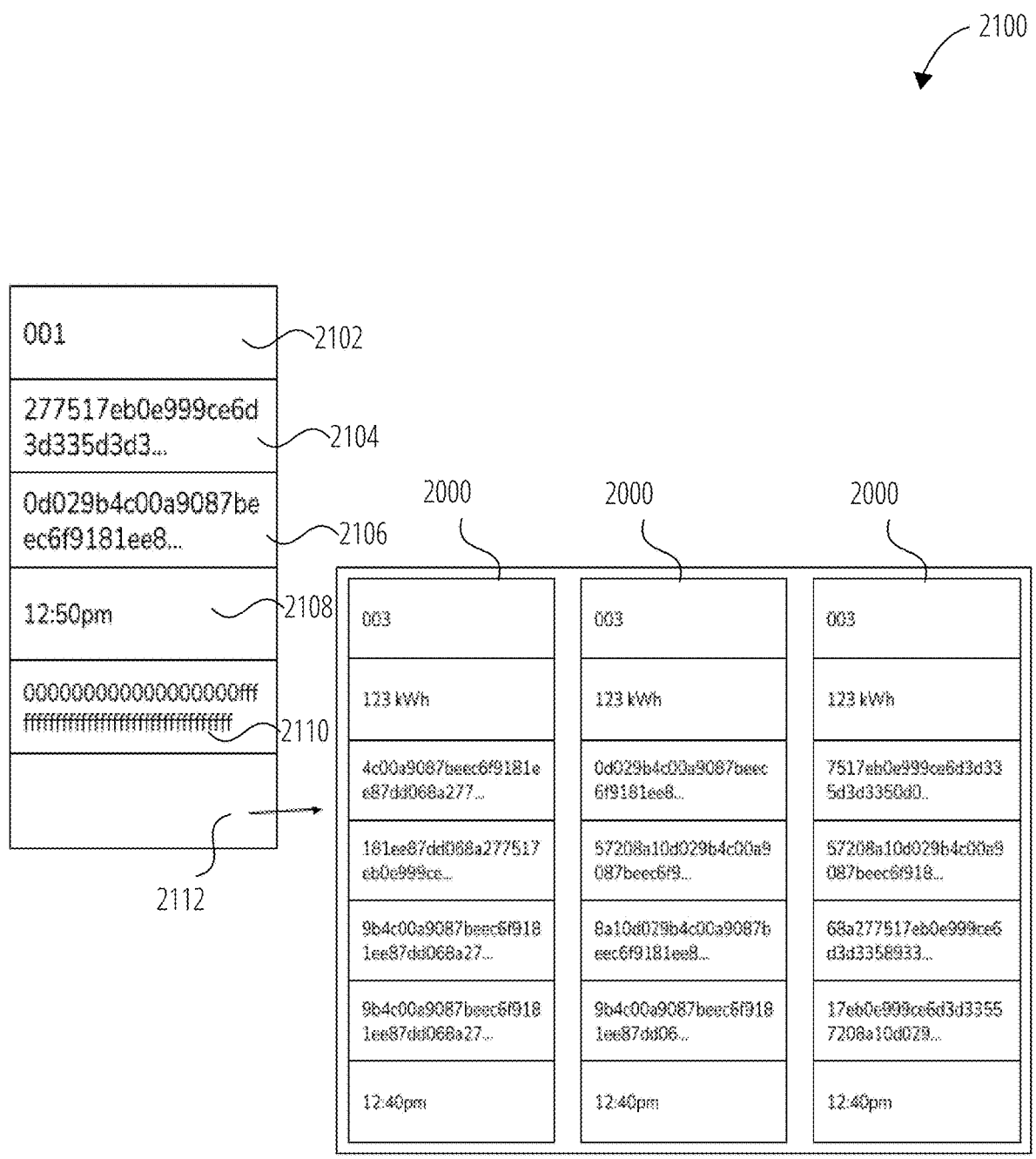
FIG. 21 illustrates a block example 2100 in accordance with one embodiment.

FIG. 21 illustrates a block example 2100 as in one embodiment. A block is a set of transactions grouped together and mined as a unit. They contain the following data points: the type of block 2102, the hash of the previous block 2104, the nonce 2106, the time period 2108, the difficulty 2110 and the set of transactions or tokens 2112, which are allocation transactions 2000 in this embodiment.

There are 4 different types of blocks: production blocks containing a set of production transactions 1800, consumption blocks containing a set of consumption transactions 1900, allocation blocks containing a set of allocation transactions 2000 and token blocks containing a set of tokens. Color is a tag or attribute associated with a block signifying a grouping. This attribute or color may be used for such purposes as the state of the blocks transactions, time since creation or source of origin of block.

Figure 22:
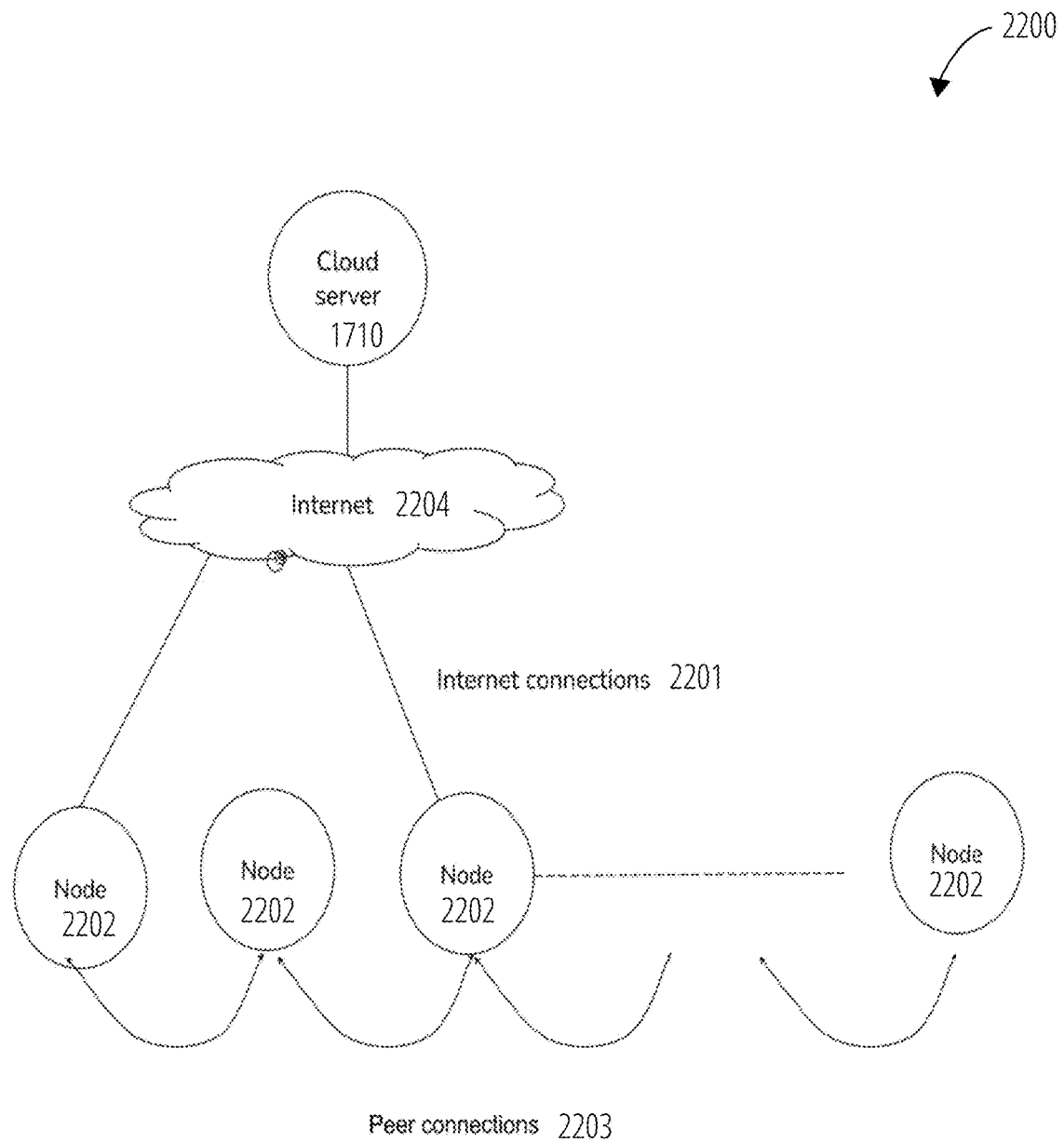
FIG. 22 illustrates a connection infrastructure 2200 in accordance with one embodiment.

FIG. 22 illustrates a connection infrastructure 2200 as in one embodiment. There are two types of connection: Internet connections 2201 via the Internet 2204 and peer connections 2203. They can be established through one or more communication standards. Peer connections 2203 and Internet connections 2201 can happen over one or more physical connection mediums—such as wired, 3g, 4g, 5g or community WIFI, etc. The peer connections 2203 and internet connections 2201 are typically over BT, zigbee, LoRa, Mesh WIFI, etc.

The coordination engine manages mining. It receives transactions from the nodes 2202, groups them into blocks and sends those blocks out to the mining pool(s). A coordinator node also delegates mining to all or a subset of nodes 2202 and, if applicable, it rotates mining among the subsets. If applicable, it also distributes power tokens.

In urban settings most or all nodes 2202 may have their own direct internet connections 2201 but in rural or remote settings, only some may have them. Peers can be contacted through the internet connection 2201 or by hopping along the peer connections 2203. The cloud 1710 is reached directly using one's internet connection or by hopping along the peer connections 2203 to reach one that has an internet connection 2201 that facilitates through connectivity to the internet 2204.

The various entities community via channels through which they send and receive data. The embedded node has three types of channels: between itself and another embedded node, this channel is used to send and receive trade transactions and contracts; between itself and its avatar node, this channel is used to send and receive sensor measurements; and between itself and its connection infrastructure 2200, this channel is used to send and receive production transactions 1800, consumption transactions 1900 and trade allocation transactions 2000.

The avatar node also has three types of channels: between itself and another avatar node, this channel is used to send and receive trade transactions and contracts; between itself and its embedded node, this channel is used to send and receive sensor measurements; and between itself and its coordination engine, this channel is used to send and receive production transactions 1800, consumption transactions 1900 and trade allocation transactions 2000.

The coordination engine has three types of channels: between itself and the nodes 2202 it manages, this channel is used to send and receive production transactions 1800, consumption transactions 1900 and trade transactions; between itself and an allocation engine, this channel is used to send and receive blocks; and between itself and another coordination engine, this channel is used to send and receive transactions or blocks.

The allocation engine has two types of channels: between itself and the coordination engine, this channel is used to send and receive blocks; and between itself and another allocation engine, this channel is used to send and receive transactions or blocks.

Data is sent in envelopes that can be transmitted in unicast, multicast, or broadcast. The measurements envelope is used to send packages containing sensor measurements. The transaction envelope is used to send packages containing transactions. The block envelope is used to send packages containing blocks. The notice envelope is used to send packages containing notices of transaction completion.

Mining a block means finding a hash for the block with difficulty 2110 less than the current target set by the latest block. Standard blockchain hashing functions, such as SHA-256, are replaced with lightweight hashing functions that have smaller outputs, cycle rate, throughput rate, power consumption and area, for example PHOTON, SPONGENT, Quark, Neiva, ARMADILLO, Lesamnta-LW, Tav-128. In addition to the computational benefits, the reduction in size of public-private key pairs and of block hashes leads to overall more compact blocks.

Blocks are mined by nodes 2202 following instructions by the coordination engine in the following steps: Nodes 2202 send transactions to the coordinator, the coordinator groups the transactions into a block, the coordinator sets difficulty 2110 and sends the block to the mining pool. Nodes 2202 mine the block, the hash is found by node, the block is sent to the coordinator for verification and the coordinator distributes the block.

Mining difficulty 2110 is set by the coordination engine (the coordinator) by considering factors such as number of active nodes 2202 and duration of interval between trade transactions or production transactions 1800. The allocation engine is responsible for transferring energy between peers. It is configured with the following parameters: list of peers, trade parameters, configuration and pricing table.

The allocation engine can operate in 3 different modes. In the case of autonomous/involuntary allocation the allocation engine receives blocks for the interval, extracts consumption transactions 1900 and production transactions 1800 from the blocks, assigns production to consumption according to the allocation method selected, and makes trade transactions for each assignment, collects all the trade transactions and makes a trade block for the interval and sends the block to the mining pool. Once the block is mined, the block is added to a blockchain 1704.

In the case of bids and offers allocation the allocation engine receives all transactions in blocks for the interval. Each production or consumption transaction is accompanied by its own price and fall back price. The engine sends offers to the offer pool and bids to the bid pool. The engine matches offers with bids, creates trade transactions for matches, collects all trade transactions into a trade block and sends the trade block to the mining pool. Once the block is mined, the block is added to blockchain 1704.

In the case of pre-production contracts, contract creation may be accomplished in the following steps: Node 1 offers to sell peer node 2 x units at price pointy in a time period z, Node 2 accepts the offer and Node 1 and node 2 make a contract and send it in envelope to the allocation engine. Contract execution may be accomplished in the following steps: The engine stores envelope pool for interval. Once interval z arrives, the engine allocates energy according to contract, adds the transaction to its list of trade transactions and sends a trade block to the mining pool. Once the block is mined, the block is added to blockchain 1704. Note: if production during the interval is in excess of the amount stipulated by the contract, the remaining production is allocated through one or more of the other methods.

There are 2 different workflows for block creation and distribution. These workflows may run concurrently or one or the other may be interrupted or absent. These scenarios are described later. In the case of the cloud flow, the cloud 1710 is in charge of creating and distributing blocks in the following steps: sensor measurements are collected by embedded nodes 2202, the node 2202 sends the sensor measurements to its avatar in the cloud 1710, the avatar node 2202 creates a transaction, the transaction is sent to the cloud coordination engine (the coordinator) and the coordinator adds the transaction to a block. Once the block is mined, the block is added to blockchain 1704. In the case cohort flow, a special node 2202 is selected to fill the role of coordinator in round-robin fashion in the following steps: the sensor measurements are collected, the node 2202 creates a transaction, the transaction is sent to the coordinator and the transaction is added to a block. Once the block is mined, the block is added to blockchain 1704.

The subservient flow has two entities: a main and a shadow. In the standard state, the main workflow and shadow workflow are both active. Transactions are recorded by main flow and notices of transactions are recorded by shadow flow. In the transition state, the shadow workflow assumes the role of main. The shadow detects main is down and records the last notice received and transitions to the secondary blockchain 1704, on which it will start recording transactions. In the isolated state, only the shadow is active, where the shadow records transactions. In the synchronization state, the main workflow is reinstated. The shadow detects main active, sends the transactions it recorded to main, transitions to primary blockchain 1704 and resumes recording notices (for example, main cloud flow and shadow cohort flow).

In the standard state, a production and consumption loop may comprise the following steps: sensor measurements are collected, the node 2202 sends measurements to its avatar in the cloud 1710 and the avatar node 2202 creates a transaction. In the case of autonomous allocation, with the sensor measurements alone, in the case of bid/offers allocation, with the sensor measurements and with a price range and in the case of a pre-production contract, with the sensor measurements, the price and the buyer's public key. The transaction is sent to the cloud 1710 mining pool and added to a block, the block is mined and added to blockchain 1704 a notice is sent to the cohort and to node 2202, the node 2202 sends notice to the cohort mining pool and is added to a block. Once the block is mined, the block is added to blockchain 1704.

Furthermore, an allocation loop may comprise the following steps: the allocation engine tallies consumption and production for the interval, assigns production to consumption according to the allocation method selected, modifies an addendum to signal transaction, sends a notice a node 2202, the node 2202 sends notice to mining pool and is added to a block. Once the block is mined, the block is added to blockchain 1704.

In the transition state, a cohort detects main is down and records the last notice received and transitions to the secondary blockchain 1704, on which it will start recording transactions. In the isolated state, the sensor measurements are collected, a node 2202 creates a transaction that is sent to the cohort mining pool and added to a block. Once the block is mined, the block is added to blockchain 1704. In the synchronization state, the cohort detects main active and sends the transactions it recorded to the cloud's 1710 mining pool. The cloud 1710 records blocks in its blockchain 1704 and resumes its main role and the cohort transitions to primary blockchain 1704, and resumes recording notices.

The collaborative flow has two entities: main a, main b. Note: main a and main b are interchangeable in this description. In the standard state, main a workflow and main b workflow are both active, transactions are recorded by main a flow and transactions are recorded by main b flow. In the transition state, main a is inactive. In the isolated state, main b is active, and transactions are recorded by main b flow. In the synchronization state, main a workflow is re-activated. Main a queries main b for transactions it missed, main b sends the transactions it recorded to main a and main a records the transactions (example main cloud flow and main cohort flow). In the standard state, a production and consumption loop may comprise the following steps: sensor measurements are collected, the node 2202 sends the sensor measurements to its avatar in the cloud 1710, the avatar node 2202 creates a transaction. In the case of autonomous allocation, with the sensor measurements and without a price, in the case of bid/offers allocation, with the sensor measurements and with a price range and in the case of a pre-production contract, with the sensor measurements, a price and the buyer's public key. A transaction is sent to the cloud 1710 mining pool and to the cohort mining pool and added to a block in the cloud 1710 and in cohort. Once the block is mined, the block is added to blockchain 1704. The allocation loop may comprise the following steps: the allocation engine tallies consumption and production for the interval, assigns production to consumption according to the allocation method selected and modifies addendum to signal transaction.

In the transition state, the cohort detects if the main is down. When the first node 2202 to lose connectivity signals this, all nodes 2202 in the cohort may take a presumptive stance to follow in case the interruption is not temporary. The cohort notes the last transaction recorded by the cloud 1710 and continues as usual. In the isolated state, the sensor measurements are collected, the node 2202 creates a transaction, the transaction is sent to the cohort mining pool and is added to a block. Once the block is mined, the block is added to blockchain 1704. In the synchronization state, the cohort detects the main active, sends the transactions it recorded to cloud's 1710 mining pool, records blocks in its blockchain 1704 and resumes recording of new transactions.

The complementary has two entities: main flow, alternative flow. In the standard state, the main workflow is active, and the transactions are recorded by main flow. In the transition state the main is inactive, an alternative detects the main flow is inactive and an alternative flow is activated. In the isolated state, an alternative flow is active, and transactions are recorded by alternative flow. In the synchronization state a main workflow is re-activated. The main queries alternative for transactions it missed, an alternative sends the transactions it recorded to main and the main records transactions (for example main cloud flow and alternative cohort flow). In the standard state, a production and consumption loop may comprise the following steps: the sensor measurements are collected, the node 2202 sends the sensor measurements to its avatar in the cloud 1710, the avatar node 2202 creates a transaction. In the case of autonomous allocation, with the sensor measurements and without a price, in the case of bid/offers allocation, with the sensor measurements and with a price range and in the case of a pre-production contract, with the sensor measurements, a price and the buyer's public key. A transaction is sent to the cloud 1710 mining pool and is added to a block. Once the block is mined, the block is added to blockchain 1704.

Furthermore, an allocation loop may comprise the following steps: the allocation engine tallies consumption and production for the interval, assigns production to consumption according to the allocation method selected and modifies addendum to signal transaction.

In the transition state, the cohort detects main is down and notes the last transaction recorded by the cloud 1710 and continues as usual. In the isolated state, the sensor measurements are collected, the nodes 2202 create transactions, the transactions are sent to the cohort mining pool and are added to a block. Once the block is mined, the block is added to blockchain 1704. In the synchronization state, the cohort detects main active and sends the transactions it recorded to cloud's 1710 mining pool. The cloud 1710 records blocks in its blockchain 1704, resumes recording of new transactions, queries the cohort for transactions it missed, sends the transactions it recorded to the cloud 1710 and records transactions and the cohort is then deactivated.

There exist three types of tokens: financing tokens, power tokens and consumer tokens. Using three separable tokenized representations enables the solution to handle the realities of local investment and digital currency laws and regulations and handles the variability in the value of currencies involved while avoiding any effect of such variations from affecting the power/energy trading loop/process. Financing tokens for project ICO (initial coin offering tokens) are purchased by investors. These tokens are converted into returns for the investors over the life-time of the system. Consumer tokens are purchased with fiat currency by consumers. Consumers can trade these tokens for power tokens. Power tokens are a means of strengthening security of measurements coming from devices and of tracing energy allocation. They serve as production validators by ensuring that prosumers cannot trade more production than their installation is capable of producing and as a tracer for transfers in ownership of production. There are two types of power tokens:

Production power tokens are used to sign production transactions into the blockchain. They may be assigned according to production capabilities and historical consumption. They may expire.

Consumption power tokens are used to sign production transactions into the blockchain. They may be assigned according to historical consumption. They may expire.

Figure 23:
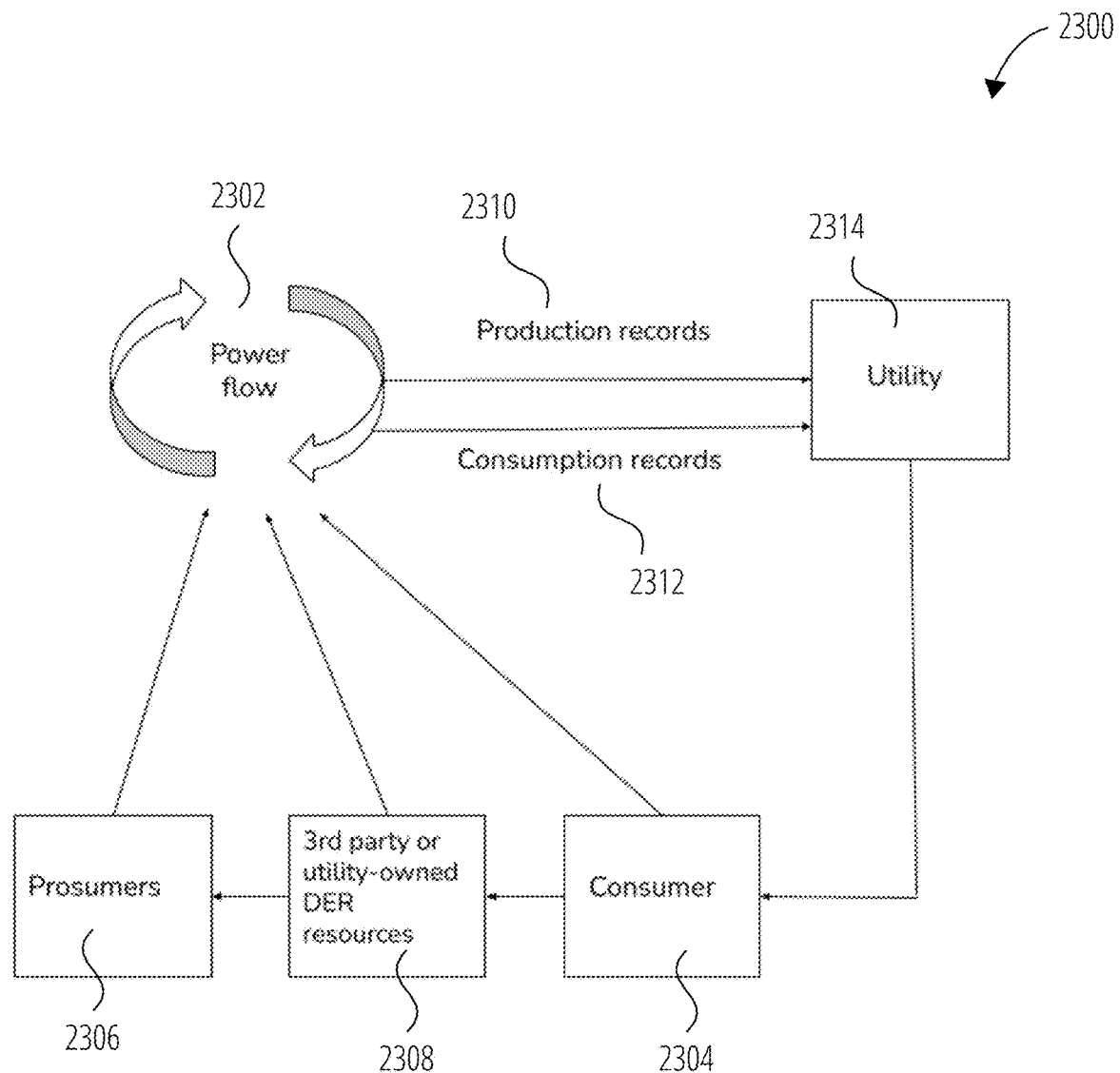
FIG. 23 illustrates a Utility and power flow diagram 2300 in accordance with one embodiment.

FIG. 23 illustrates a Utility and power flow diagram 2300 in one embodiment. The power flow 2302 receives sensor data from consumers 2304, prosumers 2306 and DERs 2308, and trades the energy available accordingly. The power flow is a token or coin based workflow that handles all the energy transactions, generates production records 2310 and consumption records 2312 and sends them to the utility 2314. This data is used to generate traditional records for billing and credits by utility.

Figure 24:
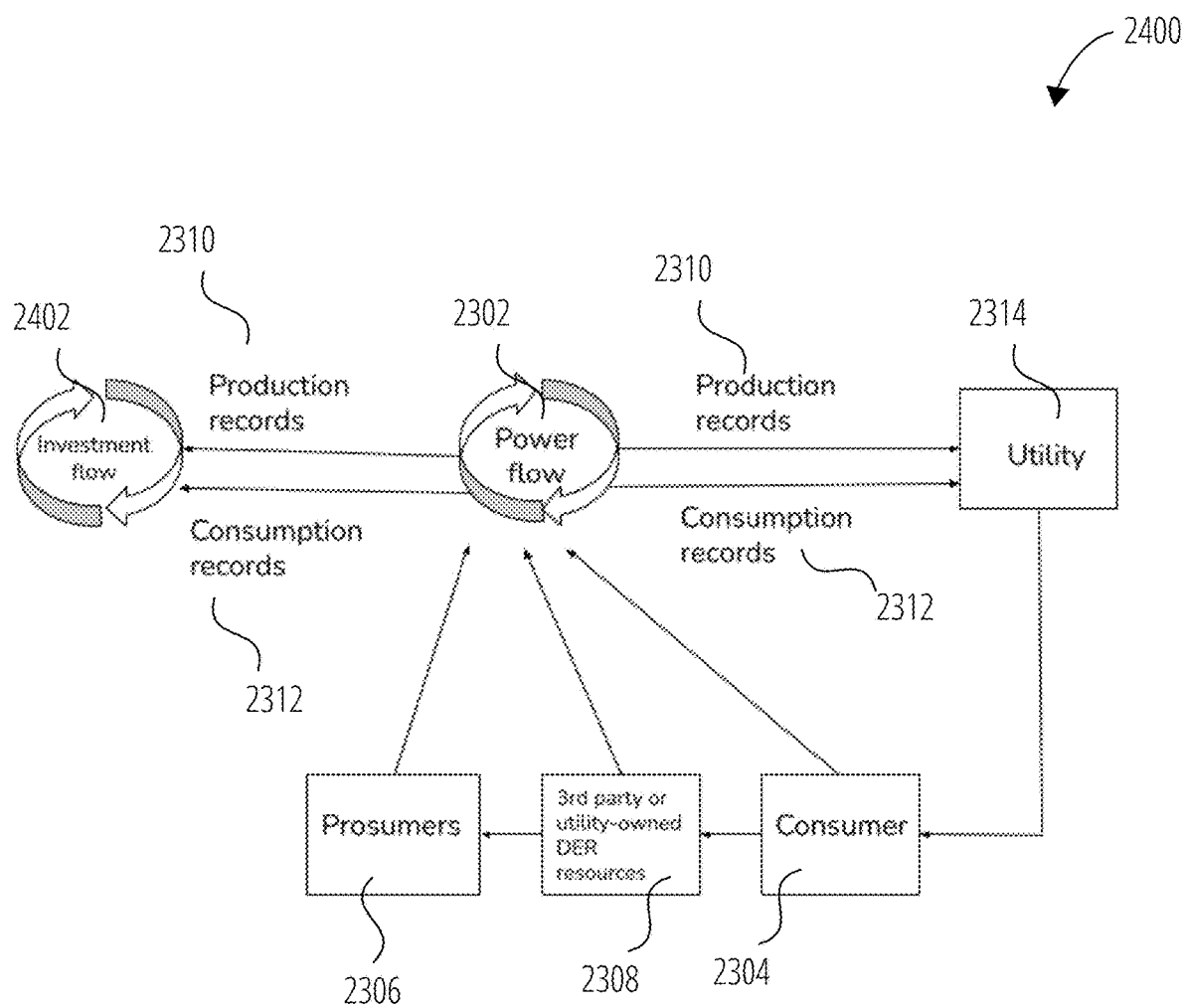
FIG. 24 illustrates an Investment flow and power flow diagram 2400 in accordance with one embodiment.

FIG. 24 illustrates an Investment flow and power flow diagram 2400 in one embodiment. The investment flow 2402 is a token or coin based workflow to facilitate and manage investment into infrastructure and return value over its lifetime. The energy produced by the DERs 2308 is traded using the power flow 2302 and the corresponding value is delivered to the investor using the investment flow 2402. In this configuration, consumers 2304 and prosumers 2306 are billed for their use of energy in the traditional way using the production records 2310 and consumption records 2312 given to utility 2314 by the power flow 2302. By combining the power flow 2302 and the investment flow 2402, we create a method to convert real money and other investment into a form that can be transacted within the power flow 2302 and returns can be converted back to the investor.

For example, investors buy into projects using real currency or crypto currencies or by providing real services. In return they receive lifetime production worth of credit tokens. Tokens may be set up to 'expire' as and when production from assets is settled by actual production and trade. These tokens could end up being traded in a secondary market.

In the configuration presented in FIG. 24, consumers 2304 and prosumers 2306 are billed for their use of energy in the traditional way and do not have to use a digital currency or tokens or participate in the consumer flow 2502.

Figure 25:
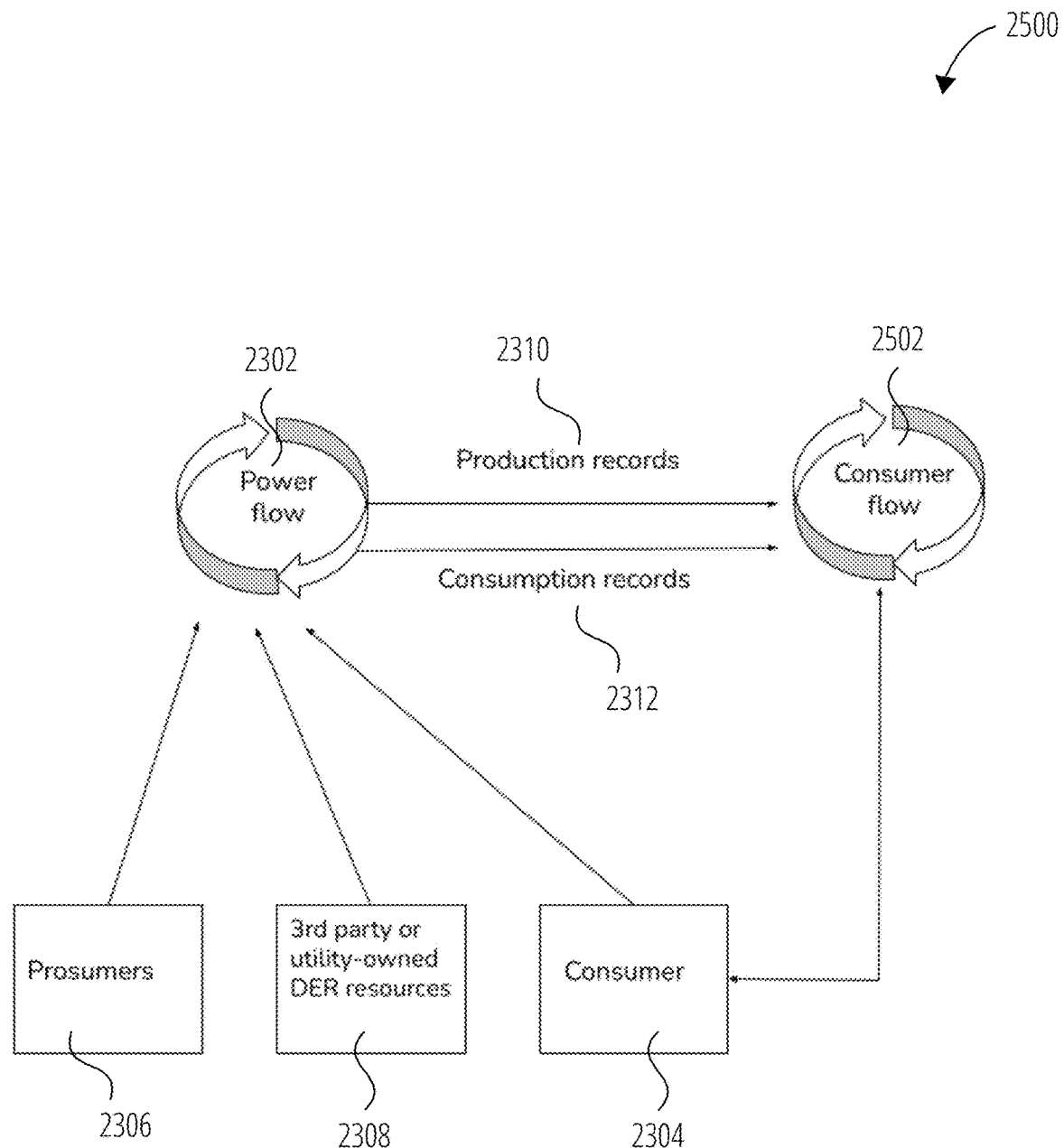
FIG. 25 illustrates a power flow and consumer flow diagram 2500 in accordance with one embodiment.

FIG. 25 illustrates a power flow and consumer flow diagram 2500 in one embodiment. Consumer flow 2502 is a token or coin based workflow to facilitate energy purchase by the end consumer. The power flow 2302 handles all the energy transactions, generates production records 2310 and consumption records 2312 and sends them to the consumer flow 2502. Consumers 2304 and prosumers 2306 use a tokenized or digital currency to pay or pre-pay for their energy use through the consumer flow 2502. In this configuration, infrastructure investment is performed in the traditional manner where utilities 2314, developers, prosumers 2306 and other third parties may spend their own capital for energy infrastructure (DERs 2308) and don't participate in an investment flow 2402.

Figure 26:
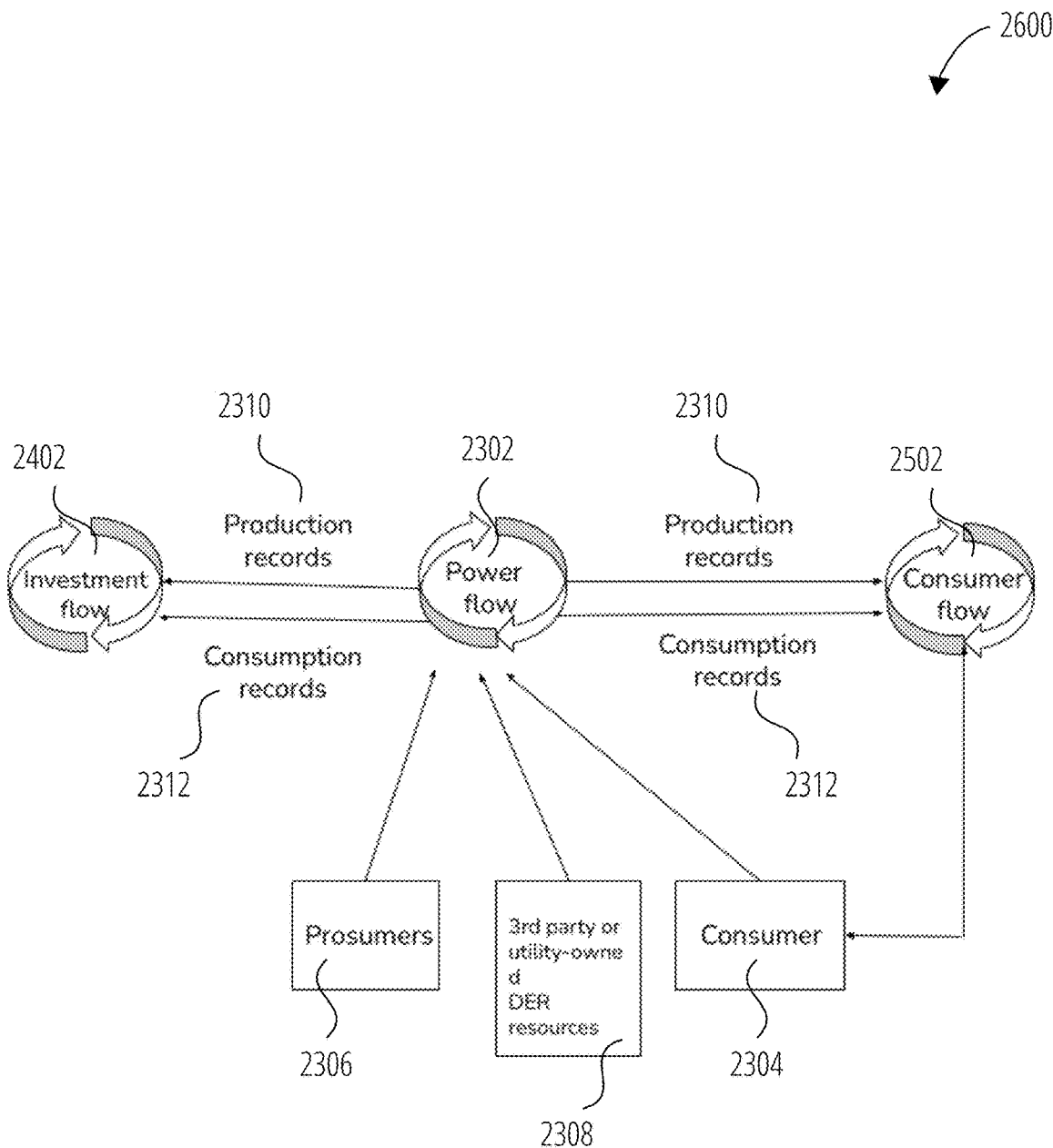
FIG. 26 illustrates an investment flow, power flow and consumer flow diagram 2600 in accordance with one embodiment.

FIG. 26 illustrates an investment flow, power flow and consumer flow diagrams 2600 in one embodiment. This configuration represents the case where the investment flow 2402 and the consumer flow 2502 are both in place. The entire system is now based on digital currency or tokens. Investments in energy infrastructure are made using crypto currency or tokens. The energy produced by the DERs 2308 is traded using the power flow 2302 and the corresponding value is delivered to the investor using the investment flow 2402. Consumers 2304 and prosumers 2306 use a tokenized or digital currency to pay for or prepay for their energy use through the consumer flow 2502. The power token bridges the interface between the investment/dividend tokens and the consumer tokens by sending production records 2310 and consumption records 2312 to both.

In the fulfillment loop, power tokens are created and distributed to prosumers 2306 by a sub-loop. Prosumers 2306 produce energy and sensors measure the production and consumption. Production or consumption is signed with the appropriate number of tokens and added to the blockchain 1704 and peers trade production and consumption. In the token creation and distribution sub-loop, nodes 2202 make private/public key-pair and send them to the cloud 1710 or coordinator. The cloud 1710 or coordinator estimates consumption, makes tokens and signs them with public values. The coordinator sends the token block to mining pools and the block is mined in the standard method. In the end-consumer loop, the consumers 2304 purchase consumer tokens and store them in their wallets that may be pre-paid in fiat currency and/or earned by doing action. The consumers 2304 trade consumer tokens for power tokens, which they also store in their wallet. In the investment loop, the power production data is received from the fulfillment loop and the investors' tokens get converted into money and expire.

Standard blockchain hashing functions are replaced with lightweight hashing functions which have smaller outputs and are easier to compute, for example PHOTON, SPONGENT, Keccak, Quark, Neiva, ARMADILLO, Lesamnta-LW, Tav-128. This reduces the size of public-private key pairs and of block hashes, leading to overall more compact blocks. Transactions can be recorded in full (i.e. containing all possible data points), in compressed form (i.e. some or all data points are compressed) or edited form (i.e. containing some but not all the data points). Transactions can transition between states as needed.

In self-managed purging, nodes 2202 elect to purge blocks without outside prompt. This occurs when the node 2202 reaches its memory capacity. Nodes follow the order of priority to purge blocks. In scheduled purging, the cloud 1710 or coordinator prompts nodes to purge blocks based on the order of priority. Ordering parameters include spent block, time of creation, external transactions and internal transactions (i.e. oldest spent external blocks get purged first and newest, unspent and internal blocks get deleted last).

For color-based expiration, colored blocks signifying purging order (ex. green blocks get purged first, yellow after, orange next, red last) may be implemented—for the same block in a blockchain 1704, nodes 2202 receive different colored blocks to increase odds that some copies are preserved in the event of purging. For example, a purging priority may be implemented where the spent green blocks are purged first, the spent yellow blocks and purged next, followed by the unspent orange blocks until the unspent red blocks are complete.

For time-based expiration, blocks are given expiry time on creation. Blocks that are expired are deleted first. The embedded blockchain network works in connection with the cloud 1710 but is also able to operate in isolation. The method and processes described provides the benefits of blockchain participation while tolerating the limitations mentioned.

The foregoing descriptions of specific embodiments of the present invention have been presented for purposes of illustration and description. They are not intended to be exhaustive or to limit the invention and method of use to the precise forms disclosed. Obviously, many modifications and variations are possible in light of the above teaching. The embodiments described were chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient but is intended to cover the application or implementation without departing from the spirit or scope of the claims of the present invention.

What is claimed is:

1. A computer-implemented method for assigning exported energy values from a distributed energy resource (DER), which provides the exported energy to a plurality of consumers of a community of energy consumers prior to transferring excess energy to a utility network, the method comprising:
   distributing the exported energy to the plurality of consumers from the DER;
   measuring said exported energy values from the DER and consumed energy values from the plurality of consumers instantaneously and continuously via a plurality of IoT edge devices connected to a cloud computing infrastructure via a telecommunication network, a respective one of the plurality of IoT edge devices coupled to the DER and to each of the energy consumers in the community of energy consumers;
   storing measured exported energy values and consumed energy values from the IoT edge devices on a memory coupled to a processor in said cloud computing infrastructure;
   differentiating said plurality of consumers based on a predetermined allocation algorithm using the processor;
   continuously assigning said exported energy values from the DER to one or more of the plurality of consumers according to instantaneous measurements of the exported energy values and of the consumed energy values and said predetermined allocation algorithms using the processor;
   determining an optimized value of the exported energy from the DER based on the assigning of the exported energy value to the one or more of the plurality of consumers;
   utilizing the processor for crediting the DER with an accurate net energy credit for the optimized value of the exported energy and the excess energy;
   generating transaction records for the DER based on the optimized value of the exported energy, and the excess energy;
   generating transaction records of the plurality of consumers based on the optimized value of the exported energy; and
   distributing energy from the DER to one or more of said plurality of consumer based on the optimized value of the exported energy.

2. The method of claim 1, wherein said allocation algorithm is executed on said processor within said one or more IoT edge devices when said telecommunication network is no longer connected to said cloud computing infrastructure.

3. The method of claim 1, wherein said memory comprises an energy production database comprising production blocks of a block chain, a community members profiles database, and an energy consumption database comprising consumption blocks of the block chain.

4. The method of claim 3, wherein said assigning said exported energy is based on energy consumption data from the plurality of consumers recorded instantaneously with energy production data from the DER.

5. The method of claim 1, wherein one or more selection criteria of said allocation algorithm comprises type of application used for said energy consumption.

6. The method of claim 5, wherein said differentiating said plurality of consumers comprises ranking said plurality of consumers based on said one or more selection criteria.

7. The method of claim 5, wherein said type of application comprises a green-friendly application.

8. The method of claim 1, further comprising determining an ideal location of the DER or an additional DER based on said optimized value of the exported energy from the DER.

9. The method of claim 1, wherein one or more selection criteria of said allocation algorithm comprises distance from the DER.

10. The method of claim 1, wherein one or more selection criteria of said allocation algorithm comprises size of demand or historic demand.

11. A system for assigning exported energy values from a distributed energy resource (DER), which provides the exported energy to a plurality of consumers of a community of energy consumers prior to exporting excess energy to a utility network, the system comprising:
   one or more IoT edge devices connected to a cloud computing infrastructure via a telecommunication network and coupled to the DER for distributing and measuring said exported energy values and consumed energy values from the plurality of consumers instantaneously and continuously;
   the processor configured to:
      execute an allocation algorithm stored in the memory for continuously assigning said measured exported energy from the DER to one or more of said plurality of consumers and for differentiating said plurality of consumers, thereby determining an optimized value of the exported energy from the DER;
      provide the DER with an accurate net energy credit for the optimized value of the exported energy and the excess energy;
      generate transaction records for the DER for the optimized value of the exported energy, and the excess energy;
      generate transaction records of the plurality of consumers based on the optimized value of the exported energy; and
      distribute energy from the DER to one or more of said plurality of consumer based on the optimized value of the exported energy.

12. The system of claim 11, wherein said allocation algorithm is executed on said processor within said one or more IoT edge devices when said telecommunication network is no longer connected to said cloud computing infrastructure.

13. The system of claim 11, wherein said memory comprises an energy production database comprising production blocks of a block chain, a community members profiles database, and an energy consumption database comprising consumption blocks of the block chain.

14. The system of claim 13, wherein the allocation algorithm determines an ideal location of the DER base on said optimized value of the exported energy from the DER.

15. The system of claim 14, wherein said assigning of said exported energy values is based on energy consumption data from the plurality of consumers recorded instantaneously with energy production data from the DER.

16. The system of claim 11, wherein one or more selection criteria of said allocation algorithm comprises type of application used for said energy consumption.

17. The system of claim 16, wherein said differentiating said plurality of consumers comprises ranking said plurality of consumers based on said one or more selection criteria.

18. The system of claim 16, wherein said type of application comprises a green-friendly application allocation.

19. The system of claim 11, wherein one or more selection criteria of said allocation algorithm comprises distance from the DER.

20. The system of claim 11, wherein one or more selection criteria of said allocation algorithm comprises size of demand or historic demand.

\* \* \* \* \*